US008838633B2

(12) United States Patent
Dhillon et al.

(10) Patent No.: US 8,838,633 B2
(45) Date of Patent: Sep. 16, 2014

(54) NLP-BASED SENTIMENT ANALYSIS

(75) Inventors: Navdeep S. Dhillon, Seattle, WA (US); Jisheng Liang, Bellevue, WA (US)

(73) Assignee: VCVC III LLC, Seattle, WA (US)

( * ) Notice: Subject to any disclaimer, the term of this patent is extended or adjusted under 35 U.S.C. 154(b) by 80 days.

(21) Appl. No.: 13/208,278

(22) Filed: Aug. 11, 2011

(65) Prior Publication Data
US 2012/0041937 A1   Feb. 16, 2012

Related U.S. Application Data

(60) Provisional application No. 61/372,684, filed on Aug. 11, 2010.

(51) Int. Cl.
*G06F 7/00* (2006.01)
*G06F 17/30* (2006.01)

(52) U.S. Cl.
CPC ................ *G06F 17/30731* (2013.01)
USPC ......................................... 707/758

(58) Field of Classification Search
None
See application file for complete search history.

(56) References Cited

U.S. PATENT DOCUMENTS

| 4,839,853 | A | 6/1989 | Deerwester et al. ............ 364/900 |
| 5,301,109 | A | 4/1994 | Landauer et al. ......... 364/419.19 |
| 5,317,507 | A | 5/1994 | Gallant .................. 364/419.13 |
| 5,325,298 | A | 6/1994 | Gallant .................. 364/419.19 |
| 5,331,556 | A | 7/1994 | Black, Jr. et al. ........ 364/419.08 |
| 5,377,103 | A | 12/1994 | Lamberti et al. .......... 364/419.08 |
| 5,619,709 | A | 4/1997 | Caid et al. ................ 395/794 |
| 5,634,051 | A | 5/1997 | Thomson |
| 5,778,362 | A | 7/1998 | Deerwester ................ 707/5 |
| 5,794,050 | A | 8/1998 | Dahlgren et al. ........... 395/708 |
| 5,794,178 | A | 8/1998 | Caid et al. ................ 704/9 |
| 5,799,268 | A | 8/1998 | Boguraev ................. 704/9 |
| 5,848,417 | A | 12/1998 | Shoji et al. ............... 707/102 |
| 5,857,179 | A | 1/1999 | Vaithyanathan et al. ....... 707/2 |
| 5,884,302 | A | 3/1999 | Ho ...................... 707/3 |
| 5,933,822 | A | 8/1999 | Braden-Harder et al. ...... 707/5 |
| 5,950,189 | A | 9/1999 | Cohen et al. .............. 707/3 |
| 5,982,370 | A | 11/1999 | Kamper .................. 345/356 |
| 6,006,221 | A | 12/1999 | Liddy et al. .............. 707/5 |
| 6,006,225 | A | 12/1999 | Bowman et al. ............ 705/5 |

(Continued)

FOREIGN PATENT DOCUMENTS

| EP | 0 280 866 | 9/1988 |
| EP | 0 597 630 | 7/2002 |

(Continued)

OTHER PUBLICATIONS

Abraham, "FoXQ—Xquery by Forms," Human Centric Computing Languages and Environments, Proceedings 2003 IEEE Symposium, Oct. 28-31, 2003, Piscataway, New Jersey, pp. 289-290.

(Continued)

*Primary Examiner* — Taelor Kim
(74) *Attorney, Agent, or Firm* — Lowe Graham Jones PLLC

(57) ABSTRACT

Methods, systems, and techniques for providing sentiment analysis and for presenting the results of such analysis Example embodiments provide a Sentiment Analysis System ("SAS"), which provides tools to enable authors, programmers, users, developers, and the like to incorporate sentiment analysis into their content, such as into their web pages, and other web blogs or textual content. In one embodiment, the SAS provides a Sentiment Analysis Engine, an SAS API, and one or more user interface tools for presenting sentiment analysis.

16 Claims, 26 Drawing Sheets

(56) References Cited

U.S. PATENT DOCUMENTS

| | | | |
|---|---|---|---|
| 6,026,388 A | 2/2000 | Liddy et al. ..................... 707/1 |
| 6,061,675 A | 5/2000 | Wical ............................. 706/45 |
| 6,064,951 A | 5/2000 | Park et al. ........................ 704/8 |
| 6,122,647 A | 9/2000 | Horowitz et al. ............. 707/513 |
| 6,192,360 B1 | 2/2001 | Dumais et al. .................... 707/6 |
| 6,202,064 B1 | 3/2001 | Julliard ............................ 707/5 |
| 6,246,977 B1 | 6/2001 | Messerly et al. ................. 704/9 |
| 6,363,373 B1 | 3/2002 | Steinkraus ........................ 707/3 |
| 6,405,190 B1 | 6/2002 | Conklin ........................... 707/3 |
| 6,411,962 B1 | 6/2002 | Kupiec |
| 6,460,029 B1 | 10/2002 | Fries et al. |
| 6,510,406 B1 | 1/2003 | Marchisio |
| 6,584,464 B1 | 6/2003 | Warthen |
| 6,601,026 B2 | 7/2003 | Appelt et al. |
| 6,728,707 B1 | 4/2004 | Wakefield et al. |
| 6,732,097 B1 | 5/2004 | Wakefield et al. |
| 6,732,098 B1 | 5/2004 | Wakefield et al. |
| 6,738,765 B1 | 5/2004 | Wakefield et al. |
| 6,741,988 B1 | 5/2004 | Wakefield et al. |
| 6,745,161 B1 | 6/2004 | Arnold et al. ..................... 704/7 |
| 6,757,646 B2 | 6/2004 | Marchisio ......................... 704/8 |
| 6,859,800 B1 | 2/2005 | Roche et al. ...................... 707/3 |
| 6,862,710 B1 | 3/2005 | Marchisio ................. 715/501.1 |
| 6,910,003 B1 | 6/2005 | Arnold et al. ..................... 704/4 |
| 6,996,575 B2 | 2/2006 | Cox et al. ...................... 707/102 |
| 7,051,017 B2 | 5/2006 | Marchisio ......................... 707/3 |
| 7,054,854 B1 | 5/2006 | Hattori et al. .................... 707/3 |
| 7,171,349 B1 | 1/2007 | Wakefield et al. ................ 704/9 |
| 7,283,951 B2 | 10/2007 | Marchisio et al. ................ 704/9 |
| 7,398,201 B2 | 7/2008 | Marchisio et al. ................ 704/9 |
| 7,403,938 B2 | 7/2008 | Harrison et al. .................. 707/3 |
| 7,451,135 B2 | 11/2008 | Goldman et al. |
| 7,526,425 B2* | 4/2009 | Marchisio et al. ................ 704/9 |
| 7,788,084 B2 | 8/2010 | Brun et al. |
| 8,132,103 B1 | 3/2012 | Chowdhury et al. |
| 8,412,557 B1* | 4/2013 | Lloyd et al. ................. 705/7.29 |
| 2002/0007267 A1 | 1/2002 | Batchilo et al. ................... 704/9 |
| 2002/0010574 A1 | 1/2002 | Tsourikov et al. ................ 704/9 |
| 2002/0022988 A1* | 2/2002 | Columbus et al. ............. 705/11 |
| 2002/0059161 A1 | 5/2002 | Li ...................................... 707/1 |
| 2002/0078041 A1 | 6/2002 | Wu .................................... 707/4 |
| 2002/0091671 A1 | 7/2002 | Prokoph ........................... 707/1 |
| 2002/0103789 A1 | 8/2002 | Turnbull et al. .................. 707/3 |
| 2002/0156763 A1 | 10/2002 | Marchisio ......................... 707/1 |
| 2003/0004716 A1 | 1/2003 | Haigh et al. ................... 704/238 |
| 2003/0101182 A1 | 5/2003 | Govrin et al. .................... 707/7 |
| 2003/0115065 A1 | 6/2003 | Kakivaya et al. .......... 704/270.1 |
| 2003/0115191 A1 | 6/2003 | Copperman et al. ............. 707/3 |
| 2003/0233224 A1 | 12/2003 | Marchisio et al. ................ 704/4 |
| 2004/0010508 A1 | 1/2004 | Fest et al. |
| 2004/0044669 A1 | 3/2004 | Brown et al. |
| 2004/0064447 A1 | 4/2004 | Simske et al. .................... 707/5 |
| 2004/0103090 A1 | 5/2004 | Dogl et al. ........................ 707/3 |
| 2004/0125877 A1 | 7/2004 | Chang et al. ............. 375/240.28 |
| 2004/0167870 A1 | 8/2004 | Wakefield et al. ................ 707/1 |
| 2004/0167883 A1 | 8/2004 | Wakefield et al. ................ 707/3 |
| 2004/0167884 A1 | 8/2004 | Wakefield et al. ................ 707/3 |
| 2004/0167885 A1 | 8/2004 | Wakefield et al. ................ 707/3 |
| 2004/0167886 A1 | 8/2004 | Wakefield et al. ................ 707/3 |
| 2004/0167887 A1 | 8/2004 | Wakefield et al. ................ 707/3 |
| 2004/0167907 A1 | 8/2004 | Wakefield et al. ........... 707/100 |
| 2004/0167908 A1 | 8/2004 | Wakefield et al. ........... 707/100 |
| 2004/0167909 A1 | 8/2004 | Wakefield et al. ........... 707/100 |
| 2004/0167910 A1 | 8/2004 | Wakefield et al. ........... 707/100 |
| 2004/0167911 A1 | 8/2004 | Wakefield et al. ........... 707/100 |
| 2004/0221235 A1 | 11/2004 | Marchisio et al. ........... 715/534 |
| 2004/0243388 A1 | 12/2004 | Corman et al. ................... 704/1 |
| 2005/0108262 A1 | 5/2005 | Fawcett, Jr. et al. |
| 2005/0138018 A1 | 6/2005 | Sakai et al. ....................... 707/3 |
| 2005/0144064 A1 | 6/2005 | Calabria et al. ................ 705/14 |
| 2005/0149494 A1 | 7/2005 | Lindh et al. ...................... 707/3 |
| 2005/0177805 A1 | 8/2005 | Lynch et al. ................... 715/968 |
| 2005/0197828 A1 | 9/2005 | McConnell et al. .............. 704/9 |
| 2005/0210000 A1 | 9/2005 | Michard ........................... 707/3 |
| 2005/0216443 A1 | 9/2005 | Morton et al. .................... 707/3 |
| 2005/0267871 A1 | 12/2005 | Marchisio et al. ................ 707/3 |
| 2006/0149734 A1 | 7/2006 | Egnor et al. ...................... 707/7 |
| 2006/0279799 A1 | 12/2006 | Goldman |
| 2007/0156669 A1 | 7/2007 | Marchisio et al. |
| 2008/0005651 A1 | 1/2008 | Grefenstette et al. ......... 715/500 |
| 2008/0059456 A1 | 3/2008 | Chowdhury et al. ............. 707/5 |
| 2008/0097975 A1 | 4/2008 | Guay et al. ....................... 707/4 |
| 2008/0097985 A1* | 4/2008 | Olstad et al. ..................... 707/5 |
| 2008/0288456 A1 | 11/2008 | Omoigui ........................... 707/3 |
| 2008/0306899 A1* | 12/2008 | Gregory et al. .................. 707/1 |
| 2009/0144609 A1* | 6/2009 | Liang et al. ................... 715/230 |
| 2009/0228439 A1 | 9/2009 | Manolescu et al. .............. 707/3 |
| 2009/0319342 A1* | 12/2009 | Shilman et al. ................. 705/10 |
| 2010/0010994 A1 | 1/2010 | Wittig et al. |
| 2010/0023311 A1* | 1/2010 | Subrahmanian et al. ......... 704/2 |
| 2010/0145940 A1* | 6/2010 | Chen et al. .................... 707/736 |
| 2010/0299301 A1* | 11/2010 | Busch et al. ................... 706/46 |
| 2010/0306251 A1* | 12/2010 | Snell ............................. 707/769 |
| 2011/0112995 A1* | 5/2011 | Chang et al. ................... 706/12 |

FOREIGN PATENT DOCUMENTS

| | | |
|---|---|---|
| WO | WO 00/14651 | 3/2000 |
| WO | WO 00/57302 | 9/2000 |
| WO | WO 01/22280 | 3/2001 |
| WO | WO 01/80177 | 10/2001 |
| WO | WO 02/27536 | 4/2002 |
| WO | WO 02/33583 | 4/2002 |
| WO | WO 03/017143 | 2/2003 |
| WO | WO 2004/053645 | 6/2004 |
| WO | WO 2004/114163 | 12/2004 |
| WO | WO 2006/068872 | 6/2006 |

OTHER PUBLICATIONS

Cass, "A Fountain of Knowledge," IEEE Spectrum Online, URL: http://www.spectrum.ieee.org/WEBONLY/publicfeature/jan04/0104comp1.html, download date Feb. 4, 2004, 8 pages.

Feldman et al., "Text Mining at the Term Level," *Proc. of the 2nd European Symposium on Principles of Data Mining and Knowledge Discover*, Nantes, France, 1998.

Ilyas et al., "A Conceptual Architecture for Semantic Search Engine," IEEE, INMIC, 2004, pp. 605-610.

Jayapandian et al., "Automating the Design and Construction of Query Forms," Data Engineering, Proceedings of the 22nd International Conference IEEE, Atlanta, Georgia, Apr. 3, 2006, pp. 125-127.

Kaiser, "Ginseng—A Natural Language User Interface for Semantic Web Search," University of Zurich, Sep. 16, 2004, URL=http://www.ifi.unizh.ch/archive/mastertheses/DA_Arbeiten_2004/Kaiser_Christian.pdf, pp. 1-84.

Liang et al., "Extracting Statistical Data Frames from Text," SIGKDD Explorations, Jun. 2005. vol. 7, No. 1, pp. 67-75.

Littman et al., "Automatic Cross-Language Information Retrieval using Latent Semantic Indexing," *In Grefenstette, G., editor*, Cross Language Information Retrieval. Kluwer, 1998.

Nagao et al., "Semantic Annotation and Transcoding: Making Web Content More Accessible," IEEE Multimedia, IEEE Computer Society, US. 8(2):69-81, Apr. 2001.

Nguyen et al., "Accessing Relational Databases from the World Wide Web," SIGMOD Record, ACM USA, Jun. 1996, vol. 25, No. 2, pp. 529-540.

Pohlmann et al., "The Effect of Syntactic Phrase Indexing on Retrieval Performance for Dutch Texts," Proceedings of RIAO, pp. 176-187, Jun. 1997.

\* cited by examiner

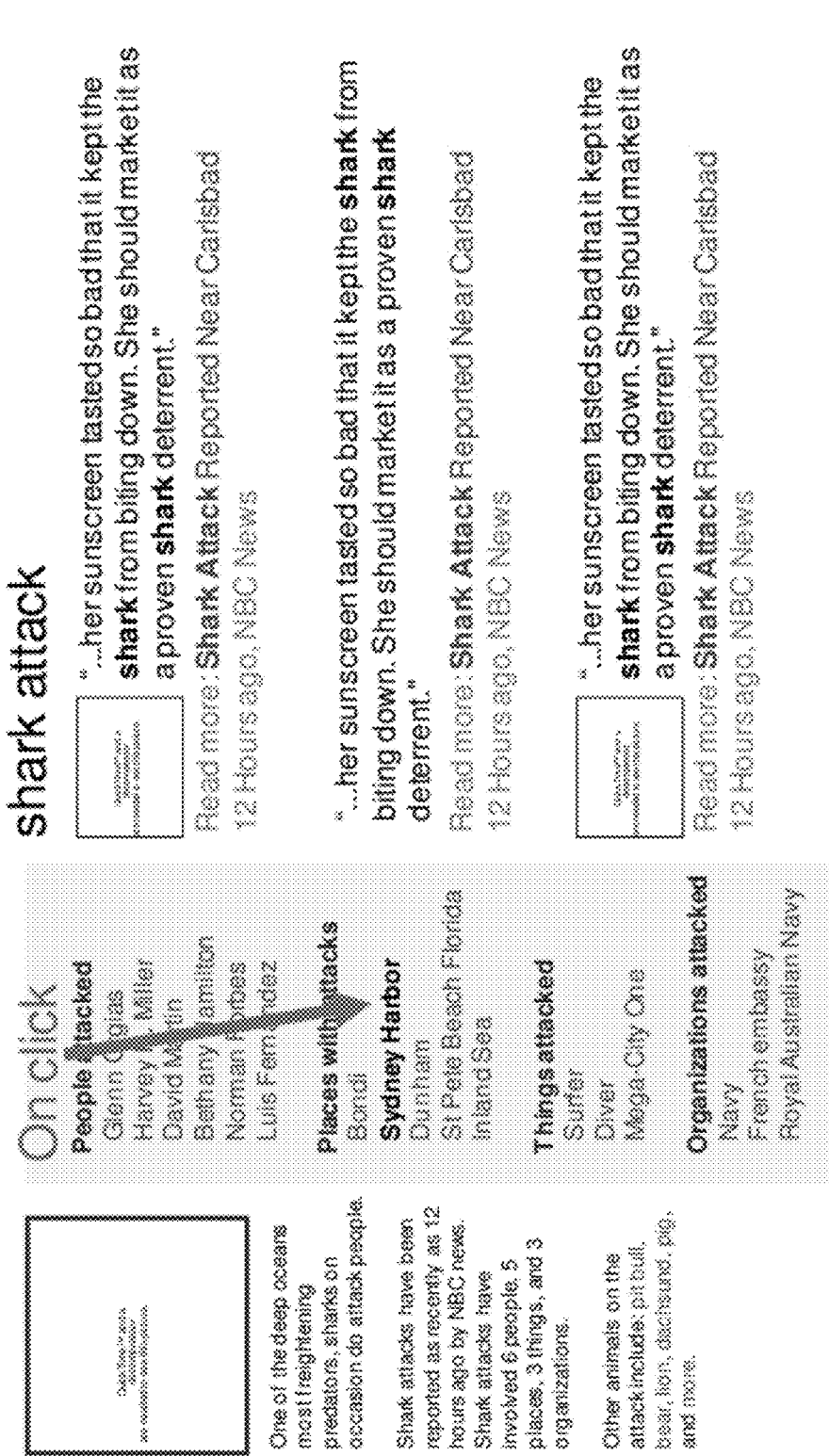

Fig. 6I

Sarah Palin attack victim ⑰

"...her sunscreen tasted so bad that it kept the shark from biting down. She should market it as a proven shark deterrent."

Read more: Shark Attack Reported Near Carlsbad
12 Hours ago, NBC News

"...her sunscreen tasted so bad that it kept the shark from biting down. She should market it as a proven shark deterrent."

Read more: Shark Attack Reported Near Carlsbad
12 Hours ago, NBC News

"...her sunscreen tasted so bad that it kept the shark from biting down. She should market it as a proven shark deterrent."

Read more: Shark Attack Reported Near Carlsbad
12 Hours ago, NBC News

⑯
People attacking
Barack Obama
John McCain
Joe Biden
Carol Fowler
Hillary Clinton
Mark Buminski

Places attacking
Washington
Seattle

Things attacking
Media
Liberals
Batman

Organizations attacking
National Finance Committee
CNN
New York Times

⑱ One of politics most frightening predators, Sarah Palin on occasion the victim of an attack, often by the vicious left wing media haters.

⑲ Sarah Palin victimizations have been reported as recently as 12 hours ago by NBC news. Sarah Palin victimizations have involved 6 people, 5 places, 3 things, and 3 organizations.

⑳ Other politicians who are attack victims include: Barack Obama, Manmohan Singh, Wide Stance Larry, Michael Bloomberg, Eric Holder, and more.

Latest attackers: Hitler, Dick Cheney, Argentina, Hugo Chavez, Mambas and more. Latest victims: Sarah Palin, Michael Jackson, Health Care, Computers, Brazil and more.

*Fig. 6K*

Sarah Palin attacked by Barack Obama

"...Barack Obama attacked Sarah Palin for being ignorant and not hunting with a real knife."

Read more: Obama attacks Palin for Hunting Woosiness
12 Hours ago, NBC News

"...Sarah was attacked by the president on the second Tuesday of the third month of the fourteenth year of the black hole sun."

Read more: Sarah Attack
12 Hours ago, NBC News

"...her sunscreen tasted so bad that it kept the shark from biting down. She should market it as a proven shark deterrent."

Read more: Shark Attack Reported Near Carlsbad
12 Hours ago, NBC News

One of politics most frightening predators, Sarah Palin on occasion is the victim of an attack, of ten by the vicious left wing media haters.

Sarah Palin victimizations have been reported as recently as 12 hours ago by NBC news. Sarah Palin victimizations have involved 6 people, 5 places, 3 things, and 3 organizations.

Other politicians who are attack victims include: Barack Obama, Manmohan Singh, Vice Sonce Larry, Michael Bloomberg, Eric Holder, and more.

People attacking Barack Obama
John McCain
Joe Biden
Carol Fowler
Hillary Clinton
Mark Bubriski

Places attacking
Washington
Seattle

Things attacking
Media
Liberals
Batman

Organizations attacking
National Finance Committee
CNN
New York Times

Latest attackers: Holder, Dick Cheney, Argentina, Hugo Chavez, Mumbai, and more.  |  Latest victims: Sarah Palin, Michael Jackson, Health Care, Democrats, Bloods, and more.

*Fig. 6M*

Fig. 6N

NLP-BASED SENTIMENT ANALYSIS

TECHNICAL FIELD

The present disclosure relates to methods, techniques, and systems for providing sentiment analysis and, in particular, to methods, techniques, and systems for providing sentiment analysis using natural language processing to determine sentiment of objects in a corpus.

BACKGROUND

Every minute of every day people express their sentiments and write them down in news articles, blog posts, other web content, and the like. Some people may regard themselves as too famous to write down their sentiments, but journalists, bloggers and other content creators are more than willing to document their feelings. Often times a famous radio commentator will bash a politician, or a politician will thrash a Hollywood actress. On occasion, a true act of heroism will be recognized, and all sorts of famous folk will follow with praise. Whether depressing or uplifting, disturbing or unnerving, tapping in to the sentiments of key actors on the world stage can be highly informative and engaging.

Determining the underlying sentiment of an article using a computing system may be difficult because of the variety of styles people employ in expressing sentiment—a comment may be an offhanded compliment in amongst an otherwise negative article, for example. Current techniques often involve traditional keyword searching for particular negative or positive words (verbs) such as "hate," "like," "distaste," etc. to guesstimate the underlying sentiment of an article.

DETAILED DESCRIPTION

Figure 1A:
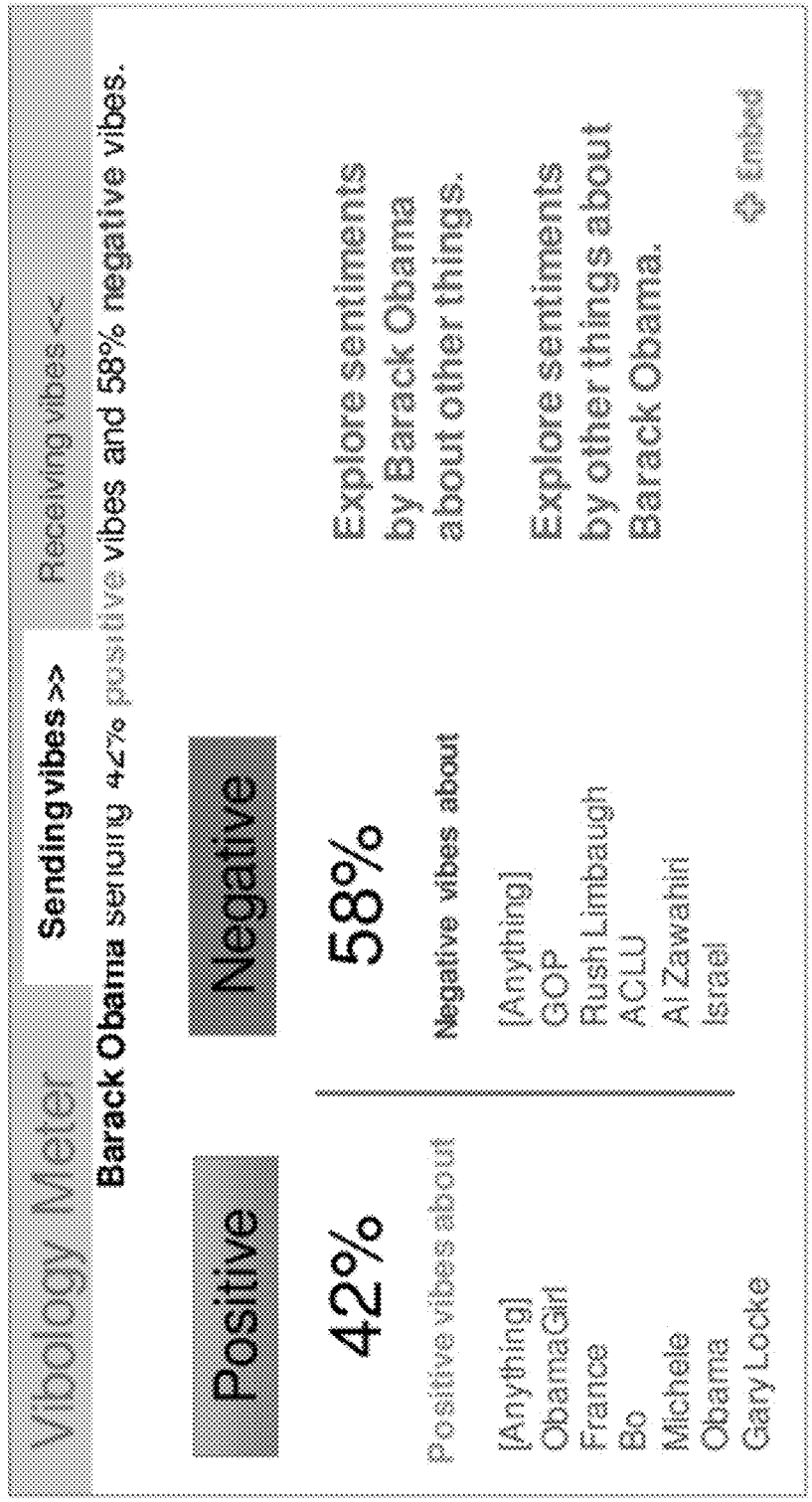
FIGS. 1A-1H illustrate example screen displays of an example user interface widget provided by an example embodiment of a Sentiment Analysis System.

The headings employed herein are used to assist in the presentation and organization of the material and are not to be used to limit the scope of the described techniques.

A. Overview

Embodiments described herein provide enhanced computer- and network-based methods, techniques, and systems for providing sentiment analysis and for presenting the results of such analysis. Example embodiments provide a Sentiment Analysis System ("SAS"), which provides tools to enable authors, programmers, users, developers, and the like to incorporate sentiment analysis into their content, such as into their web pages, and other web blogs or textual content. In some embodiments such tools are provided in the form of an Application Programming Interface ("API"). In other embodiments, such tools are provided in the form of an "ready-made" Sentiment Widget, which is programmed to analyze sentiment for a particular topic, entity, or facet (e.g., characteristic of an entity). Other embodiments provide other mechanisms and examples of user interfaces which incorporate the techniques of the SAS and deliver information via NLP-based sentiment analysis to a consumer of such results.

The SAS works to understand the sentiments, or positive and negative expressions by and about entities. Many types of applications can be built using the sentiment API in areas including, but not limited to: market intelligence, market research, sports and entertainment, brand management, product reviews and more. For example, using the sentiment API, one can:

Find the percentage of positive and negative expressions of sentiment made by an entity, or about an entity. For example, one can find out what percentage of things being written about the iPhone are positive and which percent are negative.

Discover who is criticizing and who is praising a particular person, place or thing. For example, see who is criticizing and praising IBM right now.

Read what praisers and critics are saying about an entity. For example, see what the GOP are saying about the Democrats.

Discover who or what your favorite entity is bashing and why. For example, see who Lance Armstrong is complaining about.

Discover who or what your favorite entity is praising and why. For example, see who the World Health Organization is commending and why.

The SAS uses natural language based processing techniques, such as parts of speech tagging and relationship searching, to identify sentence components such as subjects, verbs, and objects, and to disambiguate and identify entities so that the SAS can recognize whether the underlying relationships (e.g., between subjects, verbs, and objects) in the content are expressed in a negative or positive sentiment. Example relationship searching technology, which uses natural language processing to determine relationships between subjects and objects in ingested content, is described in detail in U.S. Pat. No. 7,526,425, issued on Apr. 28, 2009, and entitled "METHOD AND SYSTEM FOR EXTENDING KEYWORD SEARCHING FOR SYNTACTICALLY AND SEMANTICALLY ANNOTATED DATA," and entity recognition and disambiguation technology is described in detail in U.S. patent application Ser. No. 12/288,158, filed Oct. 15, 2008, and entitled "NLP-BASED ENTITY RECOGNITION AND DISAMBIGUATION," both of which are incorporated herein by reference in their entireties. As explained therein, relationship searching uses queries which attempt to understand the underlying content through the use of natural language processing and to recognize and understand the various relationships between entities (e.g., persons, locations, things, events, and the like) using syntactic and semantic analysis of the underlying content. The use of relationship searching, enables the SAS to establish second order (or greater order) relationships between entities and to store such information.

Although the example embodiments described below utilize the EVRI™ relationship searching described in the above listed references to achieve more robust and precise sentiment analysis, other natural language systems and Boolean keyword matching systems may be used to identify content of a particular sentiment, which can then be integrated into the user interface and presentation tools of an SAS as described further herein.

In addition, as used herein, entities are generally identifiable people, places or things, such as people, locations, organizations, products, events, and the like. Facets are generally more finely granular characteristics of entities such as categories, types, and/or characteristics of certain entities such as actor, politician, nation, drug, automobile, and the like. Topics are subjects of interest that may involve a group of entities and/or facets. Any hierarchy or non-hierarchical division of the subjects (e.g., nouns and modifiers) and objects (e.g., nouns and modifiers) searched for in content may be used.

In one example embodiment, the Sentiment Analysis System comprises one or more functional components/modules that work together to provide sentiment analysis of a set of content stored in, for example, a corpus of documents. For example, a SAS may comprise an analysis engine, an API, and example user interface tools such as real time updated widgets that are embeddable in other content (for example, a third party website). The sentiment analysis engine is responsible for determining and categorizing the various relations (e.g., S-A-O triplets, or other forms) in the underlying content according to their sentiment. Different embodiments of the sentiment analysis engine may use different techniques for discovery of sentiment, for example, relationship searching using particular verbs, phrases, and heuristics, and/or modifications of same incorporating machine learning techniques. Example implementations of the sentiment analysis engine are discussed further below.

The sentiment analysis API (application programming interface) provides a programmatic interface to the capabilities of the sentiment analysis engine to uncover sentiment from underlying content. The API may provide different forms of the results of analyzing and categorizing the content such as in summary form or with specific details. For example, EVRI™ currently supports an API adhering to a REST interface (a REST API) that is found on www.evri.com/developer in the Reference API Specification and the descriptions of the various available functions. With the EVRI API, a developer or other would be consumer of relationship query data can automatically, cost effectively and in a fully scalable manner: analyze text, get recommendations, discover relationships, mine facts and get popularity data. A particular REST API, the GetSentiment API, is provided to query and organize content according to positive and negative sentiment. A full description of this "GET sentiment" API is provided below in Section D, "Example Sentiment API Specification." The GET sentiment API offers summary data of content sentiment as well as particular details of sentiment data according to a specified source of the sentiment, type of sentiment, and/or subject (target) of the sentiment. Other API can similarly be incorporated into the SAS to provide the sentiment data, which can then be displayed with the user interface tools of the SAS.

Figure 1B:
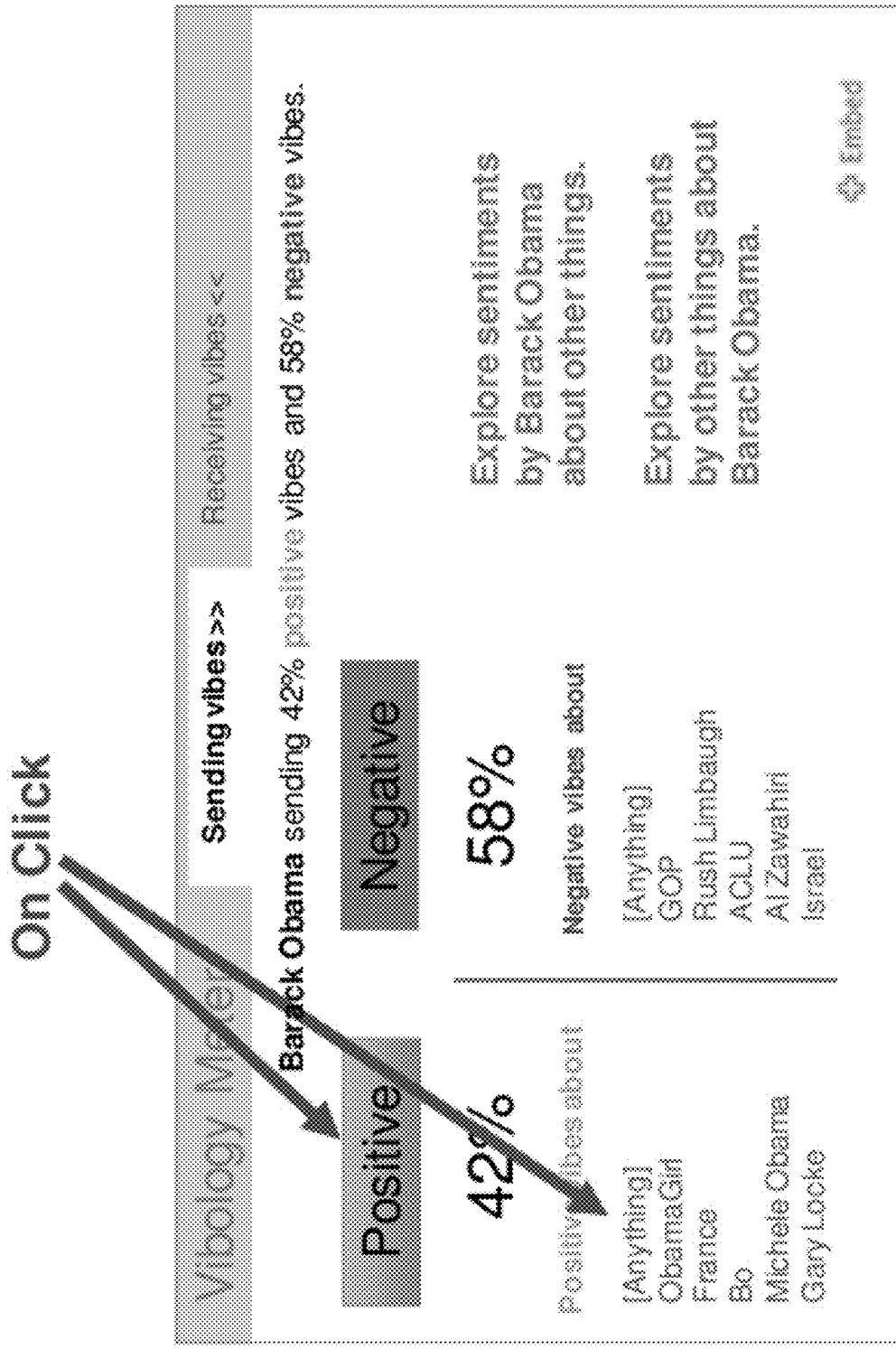
Figure 1C:
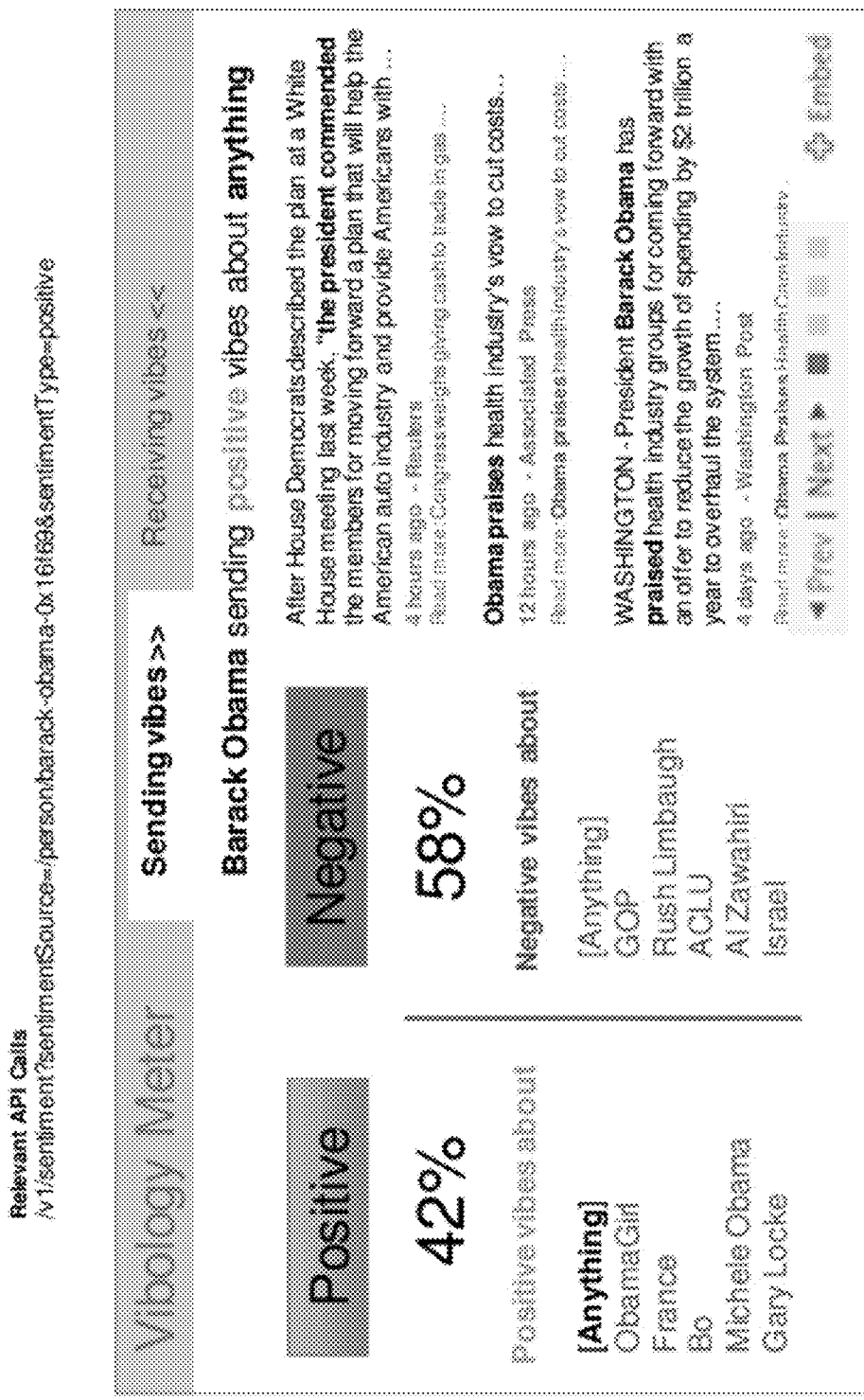
Figure 1D:
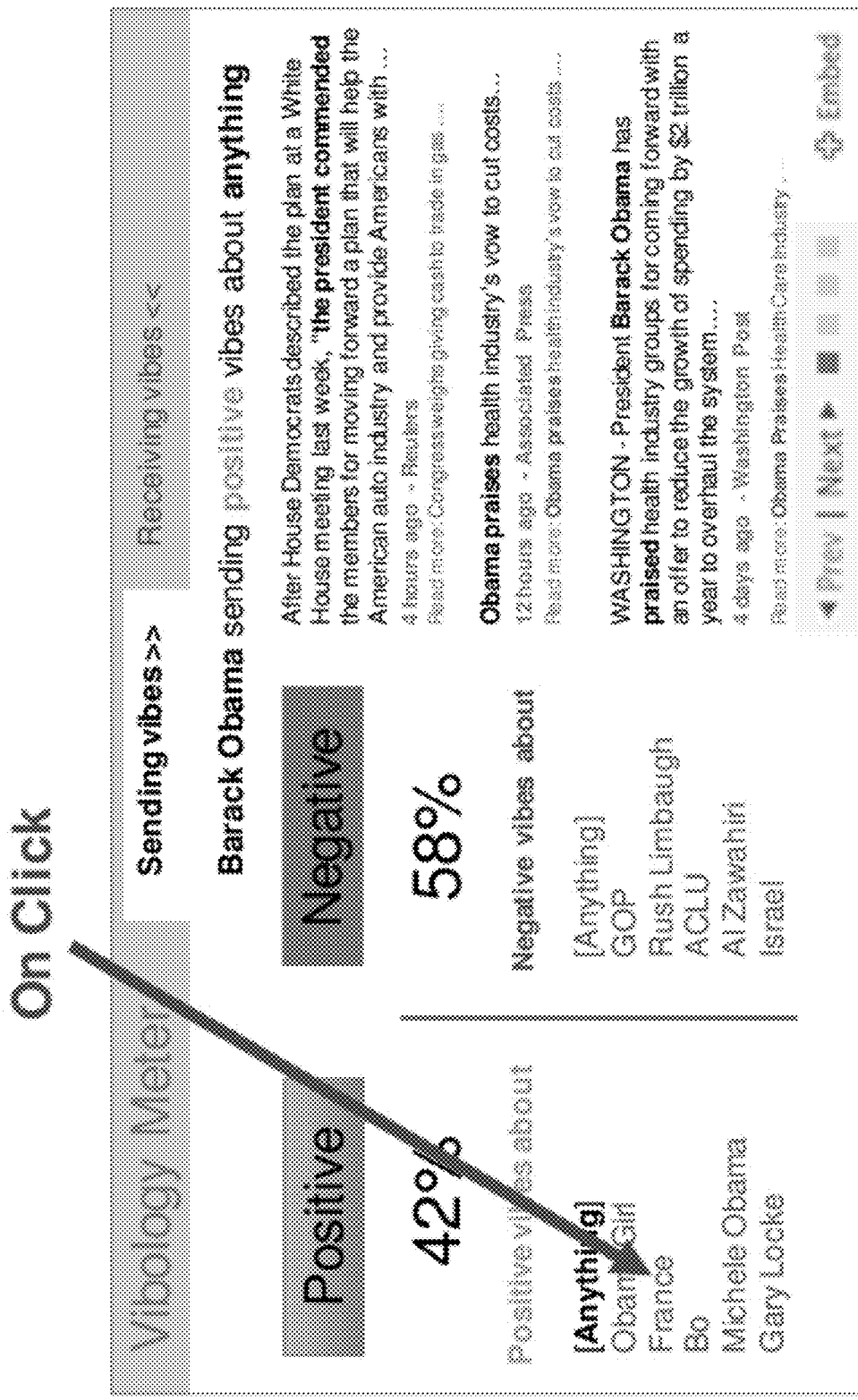
Figure 1E:
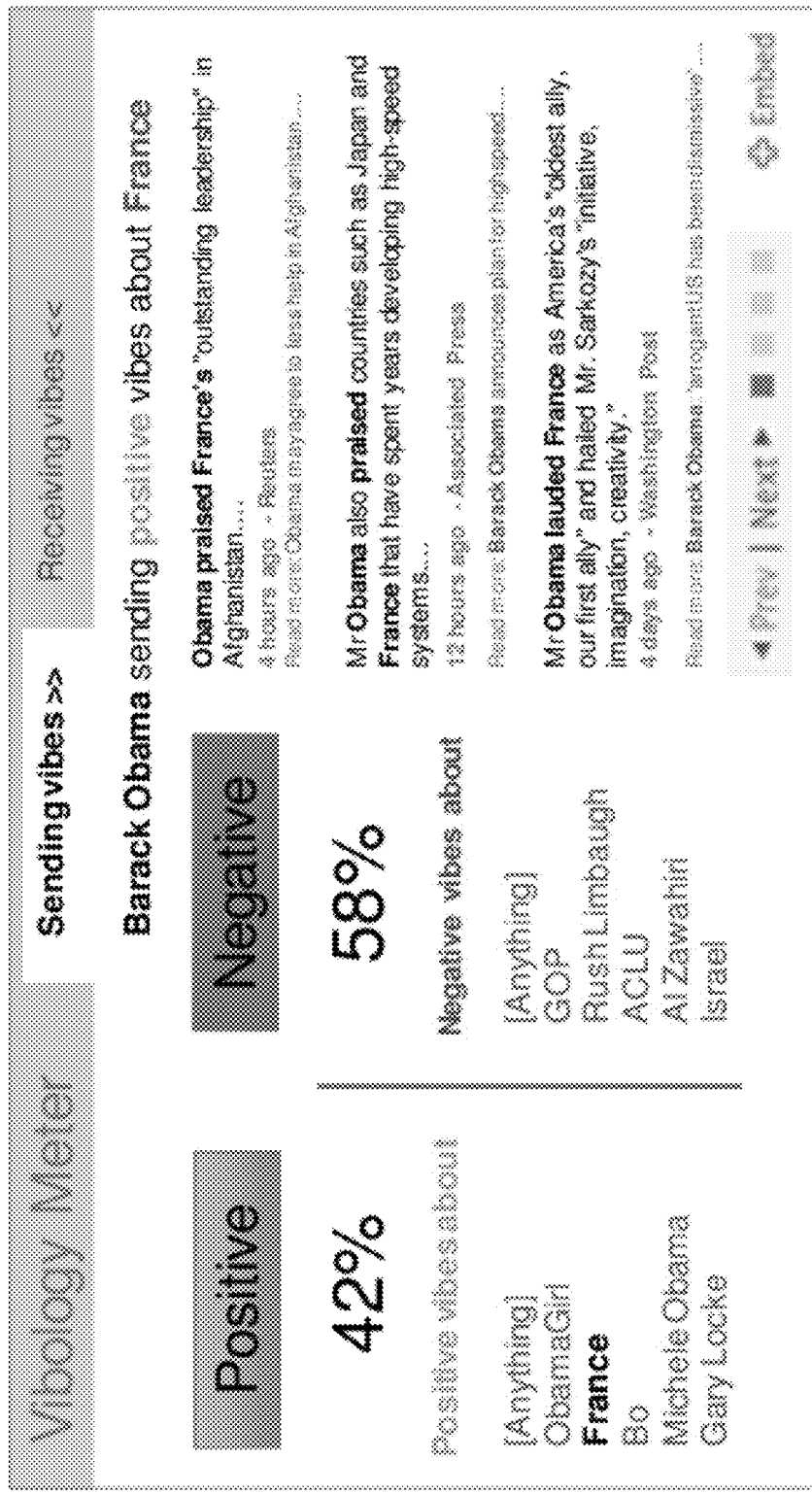
Figure 1F:
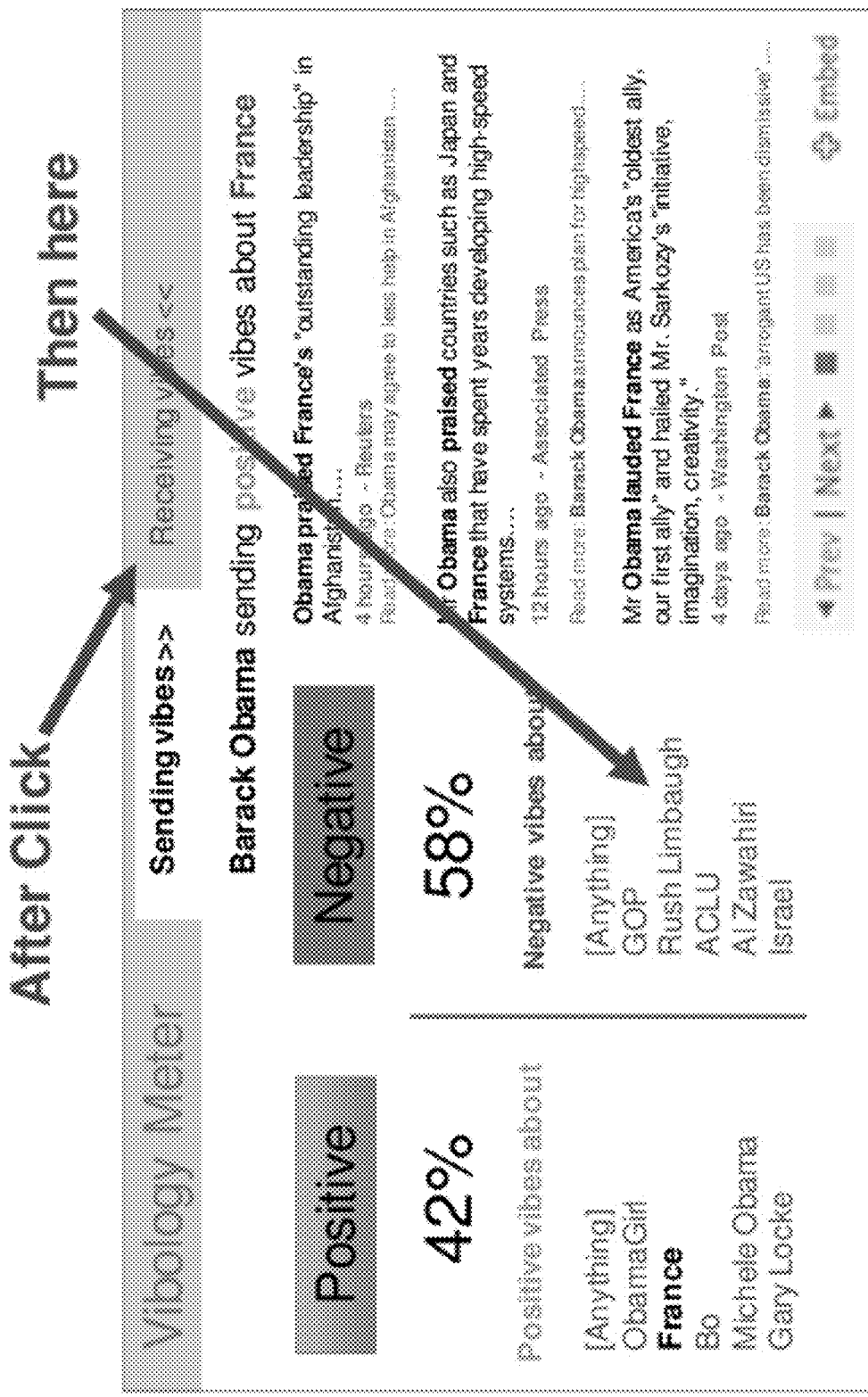
Figure 1G:
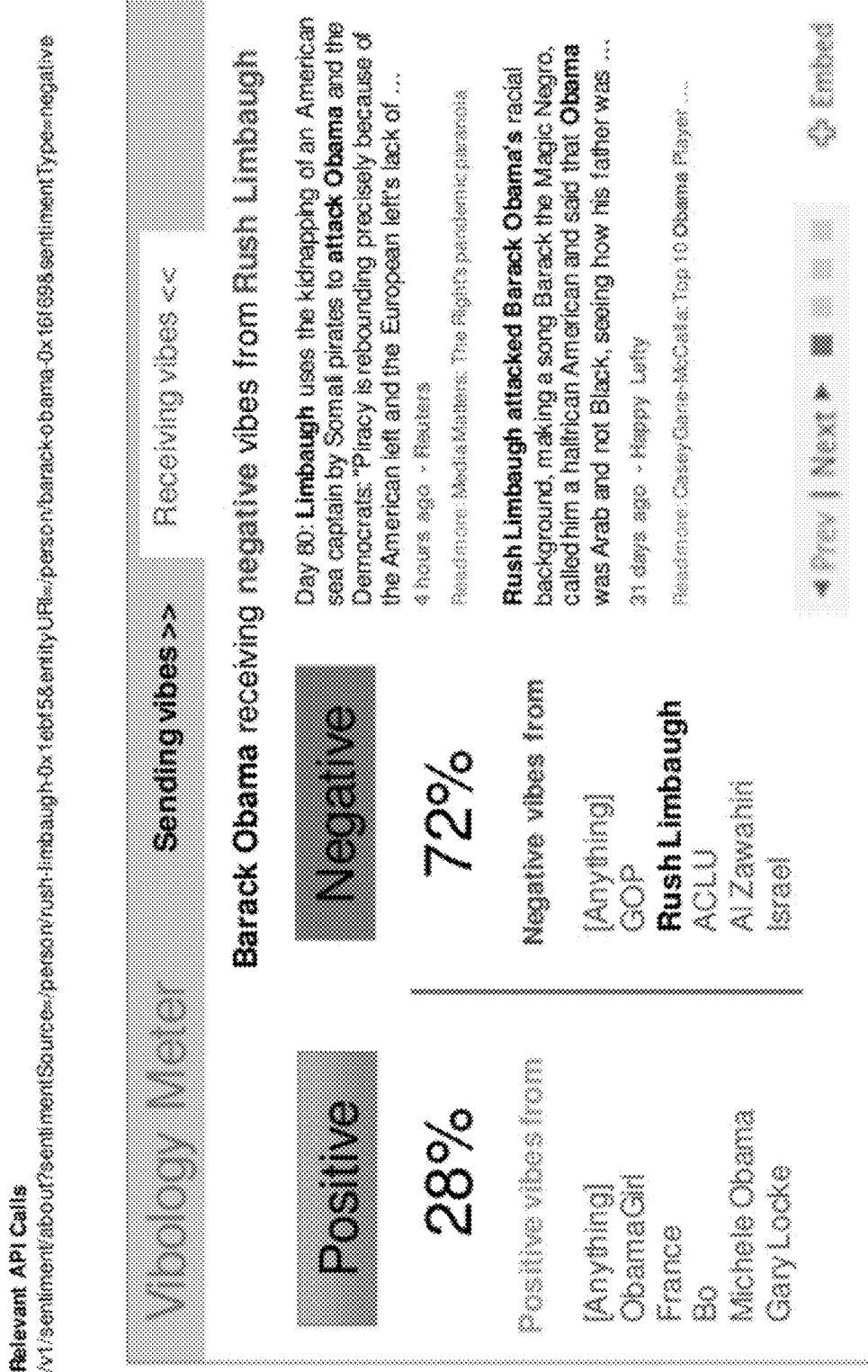
Figure 1H:
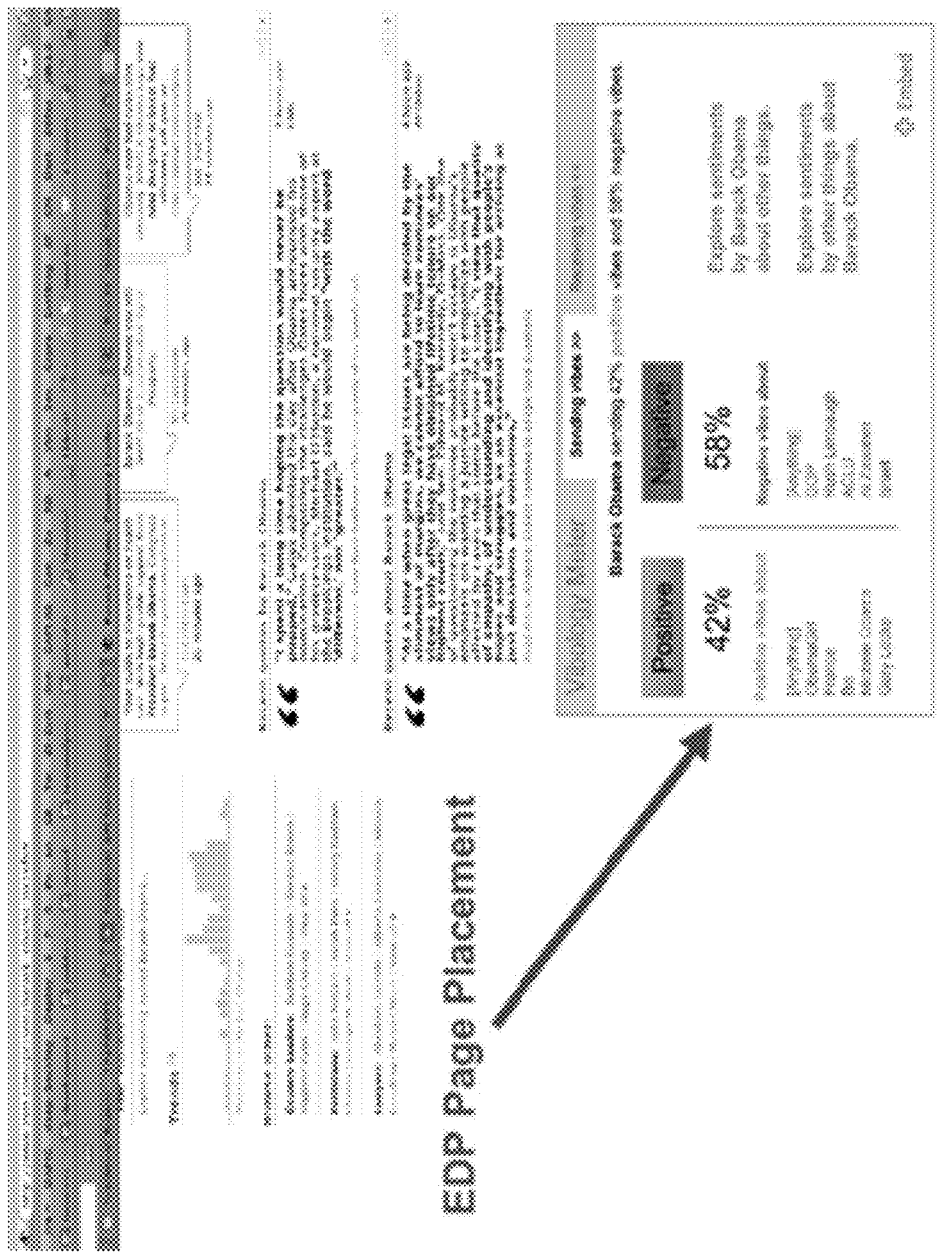
Figure 2:
FIG. 2 illustrates an example screen display of another example user interface widget provided by an example embodiment of a Sentiment Analysis System.

Example user interface tools (or widgets) are shown in FIGS. 1A-1H and in FIG. 2. These widgets can be built, for example, using the API described below in Section D, "Example Sentiment API Specification." FIGS. 1A-1H illustrate a widget externally configured to be about the entity Barack Obama corresponding to the EVRI URI: /person/barack-obama-0x16f69 (a particular entity ID).

B. Example User Interface Tools

FIG. 1A displays the overall percentage of positive sentiment and negative sentiment expressed by Barack Obama in a particular corpus, for example, a set of documents, web pages, blogs, indexed from the world-wide web. The left column displays the specific top entities being praised by Barack Obama, and the right column displays the specific entities being criticized. For example, the right column shows that Barack Obama has been criticizing the GOP, Rush Limbaugh, the ACLU, Al Zawahiri, and Israel, This sentiment summary information can be obtained by calling and executing the following REST API request, for example, using the SAS API:

/v1/sentiment/summary?sentimentSource=/person/barack-obama-0x16f69&includeSummaryDetails=true&sort=date When a user clicks on the "positive" link (which defaults to positive sentiment about any entity) or the "[anything]" link shown in the left column of FIG. 1B, the user is presented with FIG. 1C showing more detail on the entities that are the subject of Barack Obama's positive sentiment. For example, as illustrated in FIG. 1C, more detail on the positive sentiments about "anything" is shown to the right of the positive and negative entity columns. These results can be obtained by calling and executing the following REST API request, for example, using the SAS API:

/v1/sentiment/about?sentimentSource=/person/barack-obama-0x16f69&sentimentType=positive&sort=date Here, the input parameter sentimentSource refers to Barack Obama, indicating interest in vibes or sentiment expressed by Obama, as opposed to about him. Next, the input parameter sentimentType is set to positive, indicating interest in positive sentiment expressions. Finally, the input parameter sort is set to date, indicating interest in obtaining the latest results first. A discussion of how this API may be implemented to achieve such sentiment analysis using an example embodiment of the SAS is discussed with reference to FIG. 4.

The API call results also provide a specific snippet from the article, as well as a time stamp, the article title, and a link off to the source article for each result having sentiment that corresponds to the input specification. For example, in one snippet there appears a sentence stating that "the president commended . . . " The SAS, through the use of its advanced relationship searching mechanisms, recognizes "the president" to be the source of the vibes, or sentiment, and commendation to be the prime justification for his positive sentiment expression. As illustrated, this kind of analysis is beyond mere keyword (straight pattern matching) recognition and shows the ability of the SAS to use NLP to "understand" the underlying relationships expressed in the article.

Next, as the result of the user selecting (clicking on) the "France" link in FIG. 1D, the widget presents detail information about Obama's positive expressions regarding the entity France as illustrated in FIG. 1E. As can be seen, the article snippets to the right of the positive and negative columns have been changed by the widget to show sentiment analysis detail information regarding the entity France.

FIG. 1F illustrates a user selecting one of the entities (Rush Limbaugh) that is the subject of Barack Obama's negative sentiments, as well as the selection of the "receiving vibes" tab to switch the presentation to showing Obama as the subject (not source) of negative sentiment. Said differently, the presentation is switched to show Rush Limbaugh's negative sentiments about Barack Obama. The results of these selections are shown in FIG. 1G. These results can be obtained by calling and executing the following API request, for example, using the SAS API:

```
/v1/sentiment/about?entityURI=/person/barack-obama-0x16f69
&sentimentType=negative&sentimentSource=/person/
rush-limbaugh-0x1ebf5&sort=date
```

The input parameter entityURI references Barack Obama, indicating that the returned sentiment is about Barack Obama. In addition, the input parameter sentimentType is set to negative, indicating that returned sentiment expressions will be negative in nature. Also, the input parameter sentimentSource references Rush Limbaugh. The URI that refers to Rush Limbaugh can be obtained from the sentiment summary results of the request shown above in reference to FIG. 1A.

FIG. 1H illustrates an example of embedding the vibology meter widget of FIGS. 1A-1G in an entity description page (EDP) used, for example, for other purposes.

FIG. 2 illustrates an example screen display of another example user interface widget provided by an example embodiment of a Sentiment Analysis system. Again, summary information 201 (as a result of an SAS API call) can be used to present percentages of positive versus negative sentiment with respect to how the source of the sentiment has expressed the sentiment with regard to the subject of the sentiment. Here, the topic 202 of the sentiment is shown as Barack Obama and the sources of the sentiment 203a-203c are displayed in the body of the widget. For example, if the topic is Barack Obama, using this widget, users, for example readers of a blog, can see by the positive summary indicator 204 that 38% of the web feels positively about him, and by the negative summary indicator 205 that 62% of the web is expressing negative sentiment about him. In the body of the widget 200, the readers can also see who Barack Obama's top critics and entities that are praising him are, and then explore exactly what they are saying about the president. The dropdown 208 with the current value of "everything" is used to select the source. The dropdown 207 with the current value of "good vibes" is used to select positive or negative sentiment. The dropdown 206 with the current value of "getting" is used to switch between getting and receiving sentiment (source versus subject). Of course other arrangements of this data are equally suitable.

Another interface/presentation of sentiment can be seen in the AttackMachine example embodiment described below in Section F, "Attack Machine Example —Specification." The AttackMachine is an application (here, a web site) targeting an in depth assessment of all things "attack" oriented that have been written about over the indexed set of web pages, recently. It is built on top of the EVRI subject/verb/object style data extraction (using EVRI relationship searching), and can easily be extended to other verbs, or actions, such as: LoveMachine, HateMachine, KillMachine, etc. In each case, the equivalent of "attackers" and "victims" are present. For example, for LoveMachine, the source/targets of the verb love are "The lover" and "The loved".

Other applications, interfaces, tools, and widgets can be developed using the SAS API, and equivalents that interface to the Sentiment Analysis Engine capabilities.

As mentioned above, the SAS provides a sentiment analysis engine to classify and discover sentiment in content, such as from a corpus of articles. In one embodiment, the sentiment analysis engine uses a determined list of verbs or sentiment phrases in sentiment queries against the content to derive sentiment. These lists may be pre-formulated or provided by means of an external storage so that they can be defined somewhat automatically or dynamically at runtime, or through some combination of both. Certain post filtering activities may also be incorporated, such as to compare the title of a corresponding article where a relationship having sentiment is found with a relationship found therein, to make sure the title the sentiment doesn't indicate that the relationship is a backhanded compliment or criticism or sarcastic. An example of using this technique for uncovering sentiment is discussed with reference to FIG. 4 in regard to the implementation of the example vibology meter widget of FIGS. 1A-1H.

In other embodiments, machine learning techniques can be incorporated to derive the sentiment verbs and phrases that are searched for in the relationship queries. A description of one example machine learning technique is described below with respect to Section E, "Sentiment Analysis—Machine Learning Example Embodiment." It is intended to show a general approach to using machine learning to reveal the sentiment of content. Other approaches as they are developed can similarly be incorporated.

Example embodiments described herein provide applications, tools, data structures and other support to implement a Sentiment Analysis System to be used for presenting sentiment of certain content. Other embodiments of the described techniques may be used for other purposes, including for marketing or intelligence information, branding, advertising, and the like. Also, although described primarily with respect to textual content, the techniques described herein can be extrapolated to address visual content, or combined text and visual content, for example, when meta data labeling the visual content can be similarly mined for sentiment information. For example, in some cases the title of a picture may indicate that the picture contains positive or negative sentiment. Also, although certain terms are used primarily herein, other terms could be used interchangeably to yield equivalent embodiments and examples. In addition, terms may have alternate spellings which may or may not be explicitly mentioned, and all such variations of terms are intended to be included.

In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

C. Example Computing System and Processes

Figure 3:
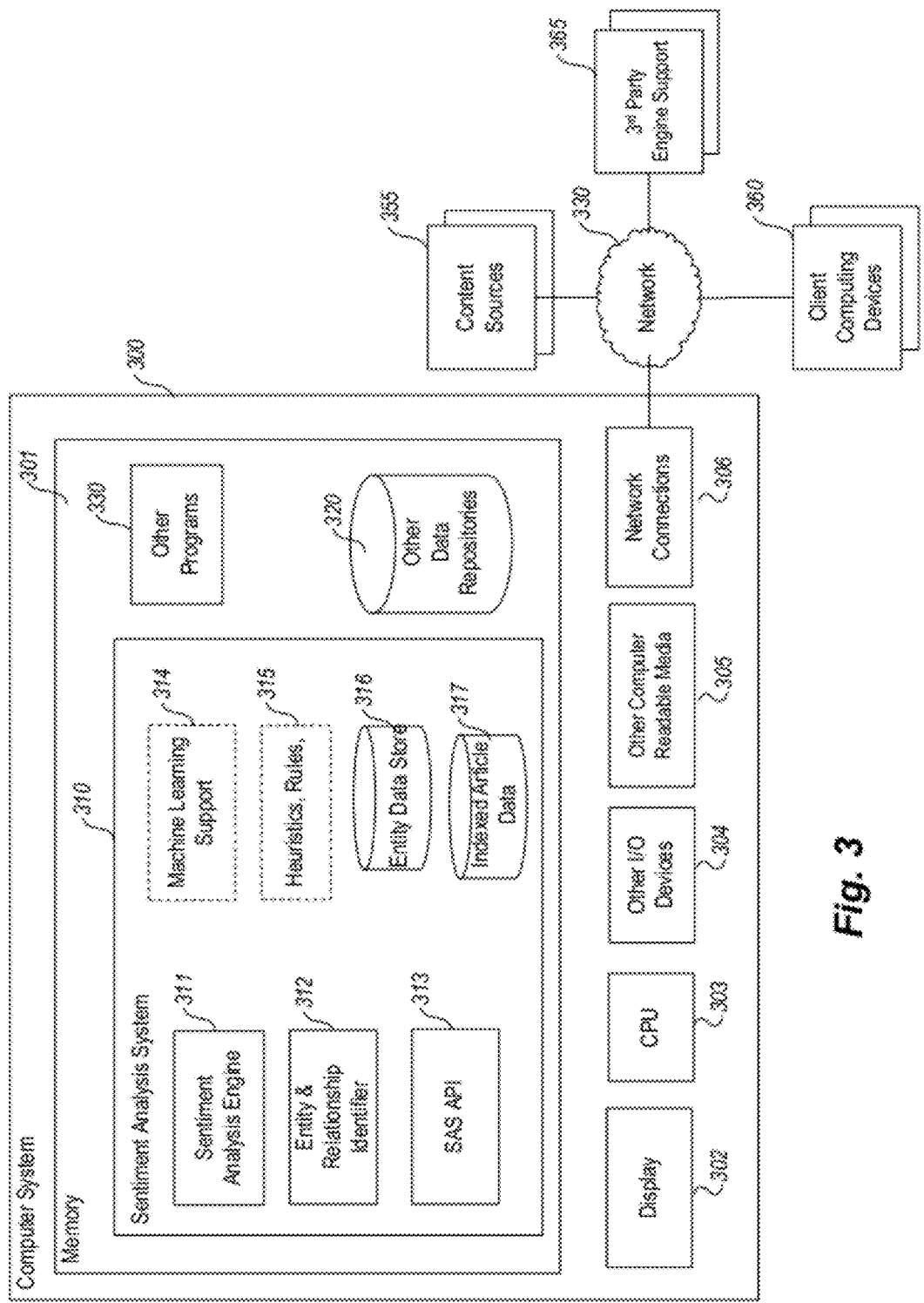
FIG. 3 is an example block diagram of an example computing system that may be used to practice example embodiments of the Sentiment Analysis System.

FIG. 3 is an example block diagram of an example computing system that may be used to practice example embodiments of the Sentiment Analysis System. Note that a general purpose or a special purpose computing system suitably instructed may be used to implement an SAS. Further, the SAS may be implemented in software, hardware, firmware, or in some combination to achieve the capabilities described herein.

The computing system 300 may comprise one or more server and/or client computing systems and may span distributed locations. In addition, each block shown may represent one or more such blocks as appropriate to a specific embodiment or may be combined with other blocks. Moreover, the various blocks of the Sentiment Analysis System 310 may physically reside on one or more machines, which use standard (e.g., TCP/IP) or proprietary interprocess communication mechanisms to communicate with each other.

In the embodiment shown, computer system 300 comprises a computer memory ("memory") 301, a display 302, one or more Central Processing Units ("CPU") 303, Input/Output devices 304 (e.g., keyboard, mouse, CRT or LCD display, etc.), other computer-readable media 305, and one or more network connections 306. The SAS 310 is shown residing in memory 301. In other embodiments, some portion of the contents, some of, or all of the components of the SAS 310 may be stored on and/or transmitted over the other computer-readable media 305. The components of the Sentiment Analysis System 310 preferably execute on one or more CPUs 303 and manage the discovery and mining of sentiment data, as described herein. Other code or programs Y30 and potentially other data repositories, such as data repository 306, also reside in the memory 301, and preferably execute on one or more CPUs 303. Of note, one or more of the components in FIG. 3 may not be present in any specific implementation. For example, some embodiments embedded in other software may not provide means for user input or display.

In a typical embodiment, the SAS 310 includes one or more Sentiment Analysis Engines 311, one or more Entity and Relationship Identifiers 312 as described in patent application Ser. No. 12/288,158, one or more SAS APIs 313, and other (optional) support, such as machine learning support 314, rules for finding sentiment 315, for example if expressed externally to the Sentiment Analysis Engines 311. In at least some embodiments, the heuristics and rules 315 are provided external to the SAS and is available, potentially, over one or more networks 350. Other and/or different modules may be implemented.

In addition, the SAS may interact via a network 350 with application or client computing device 360 that calls the API 313 to incorporate sentiment data for other purposes, e.g., uses results computed by engine 311, one or more content sources 355, and/or one or more third-party systems 365, such as machine learning tools that can be integrated with engine 311. Also, of note, the Entity Data Store 316 and the Indexed Article Data 317 may be provided external to the system and accessible over one or more networks 350. The network 350 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The mobile devices 360 include notebook computers, mobile phones, smart phones, personal digital assistants, tablet computers, desktop systems, kiosk systems, and the like.

In an example embodiment, components/modules of the SAS 310 are implemented using standard programming techniques. However, a range of programming languages known in the art may be employed for implementing such example embodiments, including representative implementations of various programming language paradigms, including but not limited to, object-oriented, functional, procedural, scripting, declarative, etc.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an SAS implementation.

In addition, programming interfaces to the data stored as part of the SAS 310 (e.g., in the data repositories 316 and 317) can be available by standard means such as through C, C++, C#, and Java APIs; libraries for accessing files, databases, or other data repositories; through scripting languages such as XML; or through Web servers, FTP servers, or other types of servers providing access to stored data. The Entity Data Store 316 and the Indexed Article Data 317 may be implemented as one or more database systems, file systems, or any other method known in the art for storing such information, or any combination of the above, including implementation using distributed computing techniques.

Also the example SAS 310 may be implemented in a distributed environment comprising multiple, even heterogeneous, computer systems and networks. For example, in one embodiment, the engine 311, the API functions 313, and the article data repository 317 are all located in physically different computer systems. In another embodiment, various modules of the SAS 310 are hosted each on a separate server machine and may be remotely located from the tables which are stored in the repositories 316 and 317. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, REST, etc.) etc. Other variations are possible. Also, other functionality could be provided by each component/module, or existing functionality could be distributed amongst the components/modules in different ways, yet still achieve the functions of an SAS.

Furthermore, in some embodiments, some or all of the components of the SAS may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and/or data structures may be stored as non-transitory content on one or more tangible computer-readable mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 4:
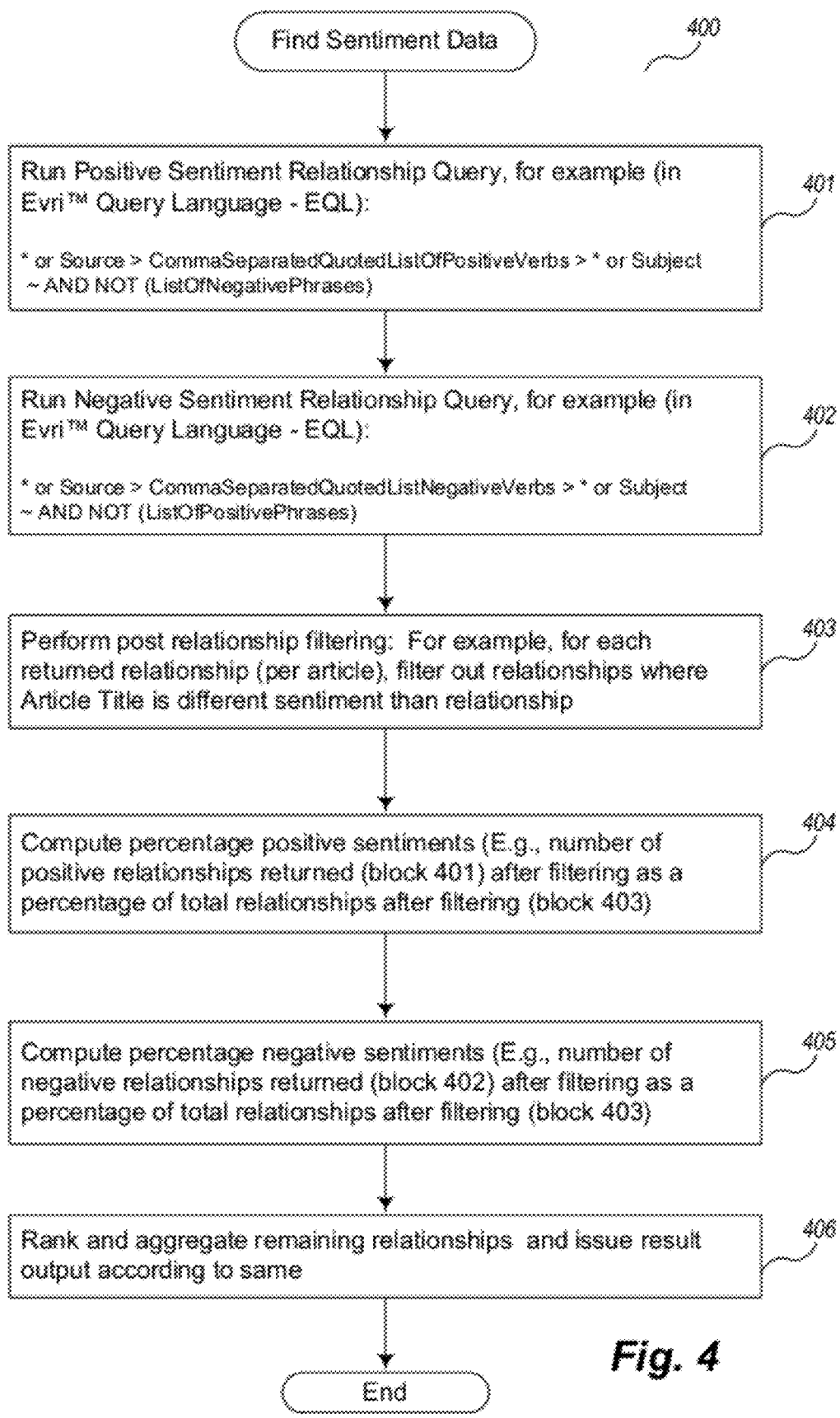
FIG. 4 is an example flow diagram of an example process performed to build the example widget of FIGS. 1A-1H according to an example embodiment of an Sentiment Analysis System.

As described in FIGS. 1A-1H and FIG. 2, one of the functions of a Sentiment Analysis System is to mine underlying content for sentiment data. FIG. 4 is an example flow diagram of an example process performed to build the example widget of FIGS. 1A-1H according to an example embodiment of an Sentiment Analysis System. Of course, other algorithms and techniques for extracting sentiment data may be used, such as the machine learning techniques described below with respect to Section E, "Sentiment Analysis—Machine Learning Example Embodiment."

In one example embodiment, in the Find Sentiment Data Routine 400, implements the SAS API discussed earlier. Different portions of the routine 400 may be executed, commensurate with the input parameters in the API call. In particular, in block 401, the SAS runs a relationship query using the NLP mechanisms described in detail in U.S. Pat. No. 7,526,425 to find positive sentiment. An example such query is:

```
* or Source > CommaSeparatedQuotedListOfPositiveVerbs > * or Subject
~ AND NOT (ListOfNegativePhrases)
``` where * (any matching) or a particular Source is specified as an entity type, particular entity ID, facet, topic, or string; CommaSeparatedQuotedListOfPositiveVerbs is exactly that—a comma separated list of verbs to be treated as positive verbs, e.g., "like," "hug," "praise," or the like; * (any matching) or a particular Subject is specified as an entity type, particular entity ID, facet, topic, or string. Different relationship query engines may require different syntax (e.g., unquoted verbs, different separators, or the like). Note that the context operator "~" is used to eliminate relationships that include negative phrases closely situated (within "n" sentences, configurable) with the found relationship. This attempts to eliminate relationships where the sentiment is backhanded or a parody, etc.

In block 402, the SAS runs a similar relationship query using the NLP mechanisms to find negative sentiment. An example such query is:

```
* or Source > CommaSeparatedQuotedListOfNegativeVerbs > * or Subject
~ AND NOT (ListOfNegativePhrases)
``` where * (any matching) or a particular Source is specified as an entity type, particular entity ID, facet, topic, or string; CommaSeparatedQuotedListOfNegativeVerbs is exactly that—a comma separated list of verbs to be treated as negative verbs, e.g., "kill," "attack," "hate," or the like; * (any matching) or a particular Subject is specified as an entity type, particular entity ID, facet, topic, or string. Different relationship query engines may require different syntax (e.g., unquoted verbs, different separators, or the like). Note that the context operator "~" is used to eliminate relationships that include positive phrases closely situated (within "n" sentences, configurable) with the found relationship. This attempts to eliminate relationships where the sentiment is a quote or a parody, etc.

In block 403, the SAS performs available post relationship filtering. For example, in some embodiments, each returned relationship is compared with the corresponding title of the article in which the relationship is found. Relationships may be eliminated if the corresponding title reflects an opposite sentiment from the relationship. Many other filtering rules containing phrases, rules, identifying specific entities to avoid, etc. may be specified at this block of execution.

In block 404, the SAS determines (computing or otherwise) the percentage of positive sentiments (e.g., number of positive relationships returned in block 401) after filtering in block 403 as a percentage of the total relationships after filtering. Similarly, in block 405, the routine determines the percentage of negative sentiments (e.g., number of negative relationships returned in block 402) after filtering in block 403 as a percentage of the total relationships after filtering. These are stored as part of the output, to support the summary statistics of the sentiment analysis API.

In block 405, the SAS ranks and aggregates the determined remaining relationships and issues resultant output, for example as specified in the API described below with respect to Section D, "Example Sentiment API Specification," and ends the routine 400. The ranking, for example, may result in only the top most "n" recent relationships being returning for a given source or subject. The aggregation allows the ranking to be performed on like relationships.

Figure 5:
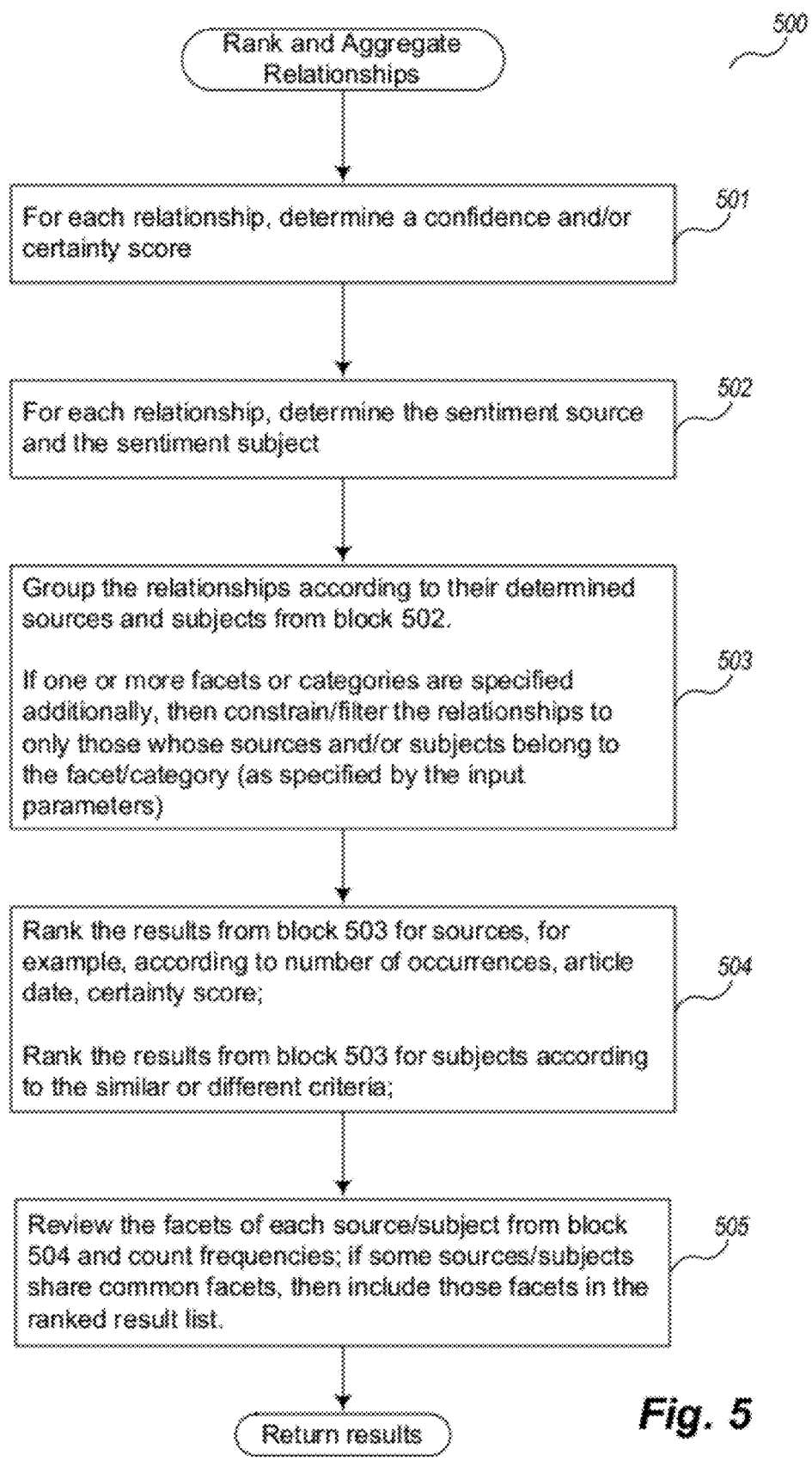
FIG. 5 is an example flow diagram of an example ranking and aggregation process of sentiment relationships performed according to an example embodiment of an Sentiment Analysis System.

Although many different ways are available to rank and aggregate the determined remaining relationships, one such method is provided in FIG. 5. Other methods use a default ranking, for example, built into indexing the content (for example, by date) and then applying one or more of the additional factors described below.

FIG. 5 is an example flow diagram of an example ranking and aggregation process of sentiment relationships performed according to an example embodiment of an Sentiment Analysis System. In block 501, for each relationship, the SAS determines a confidence and/or certainty score. This score may be based on factors such as certainty on the sentiment verbs (e.g., some verbs have strong, unambiguous sentiment indication, while some other verbs are less so). To do this, the SAS may assign and store different weights to different verbs and/or phrases. Another factor that may influence the certainty score is whether or not the sentence contains a conditional clause (e.g., People would like the iPad if it had more storage).

In block 502, the source and target (subject of sentiment) is determined for each relationship found in FIG. 4.

In block 503, the relationships are grouped according to their sources and targets determined in block 502. If one or more facets or categories are specified in the sentiment API, then the SAS constrains (filters) the relationships to only those whose sources and/or subjects belong to the facet/category specified, for example, by the input parameters.

In block 504, the results of block 503 are then ranked—for sources and for subjects/targets. In one embodiment, the following criteria may be used for such rankings:

Number of occurrences of the source/subject;
Corresponding article date;
Certainty score associated with the relationship In addition, the SAS then examines the facets of each source/subject and counts the frequency of each such facet. Common facets (e.g., shared between source or shared between targets) are also listed in the ranked list of sources/targets. Note as well that one or more of these steps may be eliminated as desired. Also, additional criteria or different criteria for ranking and/or aggregating may be substituted.

Routine 500 then returns an indication of the ranked and aggregated results.

As stated, routines 400 and 500 can be used to generate the summary sentiment data, shown for example in FIG. 1A or FIG. 2. When a user indicates a particular source or subject of sentiment, then the SAS executes a corresponding detail relationship query, such as:
"Barack Obama">CommaSeparatedListOfNegativeVerbs>*
which lists the top "n" relationships in which Barack Obama has expressed negative sentiment towards any subject. Other sentiment queries can be similarly handled.

D. Example Sentiment API Specification 1.1 Input Specifications 1.1.2 HTTP Method: GET sentiment 1.1.3 Resource: Get sentiment of something about something Description: Returns sentiment by someone or something about someone or something. A subject may or may not be specified. If a subject is specified, it may include types, facets, entities, keywords, or a Boolean combination of all. The sentimentSource may or may not be specified. If it is not, then the source of the specified sentiment is anything. If it is, it may be a specific entity (e.g., Barack Obama), one or more of a facet (e.g., actor or musician), or one or more of a type (e.g., person or organization).

Usage:
sentiment/[summary]/[about]?[inputParameters]
where applicable inputParameters include: type, facet, entityURI, phrase, search, includeDomains, excludeDomains, includeDates, includeMatchedLocations, startId, resultsPerPage, sort, and callback.

Table 1, below, describes inputParameters that are supported.

TABLE 1

| Phase | Input | Description | Values | Default |
|---|---|---|---|---|
| 1 | sentimentType | A type of sentiment | One of: positive, negative | positive |
| 1 | includeSummaryDetails | Return the source and subject of sentiment in summary information | One of: true, false | false |
| 1 | sentimentSource | The source of sentiment | A comma separated list of entity URIs. Comma separated entities are treated as an OR, meaning entity X or entity Y are the sentimentSource of each returned sentiment. A comma separated list of facets. Any string including wildcard, e.g., Obama, vict*, william shakespeare | anything |
| 1 | facet | A category of an entity within its specified type. | One or more facets. Multiple facets comma separated are treated as an OR, meaning entity of facet X, or entity of facet Y are involved in the resource. Multiple facets specified as facet=facet1&facet=facet2& . . . facet=facetN are treated as an AND, meaning entity of facet X and facet Y are involved in the resource. Facet parameters starting with a '−' will be treated as a negative query parameter. Example: facet=−politician, actor (entities not having a politican or actor facet) | None. |
| 1 | entityURI | A unique identifier to an entity. | One or more entityURIs. Multiple entities comma separated are treated as an OR, meaning entity X, or entity Y are involved in the resource. Multiple entities specified as entityURI=eURI1&entityURI=eURI2&...entityURI=eURIN are treated as an AND, meaning entity X and entity Y are involved in the resource. | None. |

TABLE 1-continued

| Phase | Input | Description | Values | Default |
|---|---|---|---|---|
| 2 | type | Corresponds to entity types | One or more of: person, location, organization, concept, product, event. Multiple types comma separated are treated as an OR, meaning entity of type X, or entity of type Y are involved in the resource. Type parameters starting with a '−' will be treated as a negative query parameter. Example: type=−person | None. |
| 2 | phrase | A keyword or phrase | Any string. | None. |
| 2 | search | A Boolean expression | Boolean expression in Lucene syntax and involves 1 or more of:<br>1. one or more entityURIs<br>2. one or more keywords<br>3. one or more types of the form type:TYPE<br>4. one or more facets of the form facet:FACET | None. |
| 2 | sort | Type of result sorting | One of: relevance, date | relevance |

1.2 Examples: Table 2, below lists various examples of the API in use.

TABLE 2

| Phase | Description | Call Syntax |
|---|---|---|
| 1 | Simple sentiment summary for sentiment of an entity | /v1/sentiment/summary?sentimentSource=/organization/nato-0x308f6 |
| 1 | Simple sentiment summary for sentiment about an entity | /v1/sentiment/summary/about?entityURI=/person/barack-obama-0x16f69 |
| 1 | Detailed sentiment summary for sentiment about an entity. Response includes sources of the sentiment about the entity. | /v1/sentiment/summary/about?entityURI=/organization/nato-0x308f6&includeSummaryDetails=true |
| 1 | Detailed sentiment summary for sentiment of an entity. Response includes subjects of the persons sentiment. | /v1/sentiment/summary?sentimentSource=/person/barack-obama-0x16f69&includeSummaryDetails=true |
| 1 | Detailed sentiment summary for sentiment about a facet. Response includes sources of the sentiment about the facet. | /v1/sentiment/summary/about?facet=musician&includeSummaryDetails=true |
| 1 | Positive sentiment of an entity about anything | /v1/sentiment/about?sentimentSource=/person/barack-obama-0x16f69&sentimentType=positive |
| 1 | Sentiment of anything about a specific entity | /v1/sentiment/about?entityURI=/person/barack-obama-0x16f69&sentimentType=positive |
| 1 | Sentiment of an entity about an entity | /v1/sentiment/about?entityURI=/person/john-mccain-0x2a2a7&sentimentSource=/person/barack-obama-0x16f69&sentimentType=negative |
| 1 | Sentiment of an entity about any facet | /v1/sentiment/about?facet=country&sentimentSource=/person/barack-obama-0x16f69 |
| 1 | Negative sentiments of musicians about politicians. | /v1/sentiment/about?facet=politician&sentimentSource=musician&sentimentType=negative |
| 2 | Negative sentiment of any entity from a list of entities about anything. Returned sentiment are from one of the specified sentimentSources. | /v1/sentiment?&sentimentType=negative&sentimentSource=/person/barack-obama-0x16f69,/person/rahm-emanuel-0x31053,/person/hillary-rodham-clinton-0x2fd4a |
| 2 | Sentiment of anyone about a list of entities | /v1/sentiment/about?entityURI=/organization/bharatiya-janata-party-0x4c623,/person/manmohan-singh-0x1a0d5,/location/india-0x320cf |

TABLE 2-continued

| Phase | Description | Call Syntax |
|---|---|---|
| 2 | Sentiment of a person about any entity belonging to any facet from a list of facets | /v1/sentiment/about?facet=actor, musician, sports_person&sentimentSource=/person/barack-obama-0x16f69 |
| 2 | Sentiment of a person about all facets in a list. | /v1/sentiment/about?facet=actor&facet=musician&sentimentSource=/person/barack-obama-0x16f69 |
| 2 | Sentiment of any person of a facet about any one entity type from a set of entity types | /v1/sentiment/about?type=organization,location,person&sentimentSource=facet:politician |
| 2 | Sentiment of any person of a facet about any entity of a facet | /v1/sentiment/about?facet=country&sentimentSource=facet:politician |
| 2 | Sentiment of any person of a facet about a keyword | /v1/sentiment/about?phrase=United States of America&sentimentSource=facet:politician |
| 2 | Sentiment of any person of a facet about one or more keywords | /v1/sentiment/about?search=bailout OR economic crisis OR economy&sentimentSource=facet:politician |
| 2 | Sentiment of a person about a keyword | /v1/sentiment/about?phrase=US&sentimentSource=/person/barack-obama-0x16f69 |
| 2 | Sentiment of any person of a facet about an expression | /v1/sentiment/about?search=/person/barack-obama-0x16f69 AND (econo* OR facet:financial_services_company OR (type:organization AND finance))&sentimentSource=facet:politician/ |
| 2 | Sentiment of any person named joe | v1/sentiment?sentimentSource=joe* |

1.3 Result Format

Below is an output independent listing of result elements:

```
format = <element name> (<element count>) -- <description>
children nodes are indented beneath parent nodes, and attributes are
   indented underneath "attributes"
MediaResult (1) -- top level Query Service search result wrapper
    sentimentSummaryList(0,1)
       sentimentSummary(2)
          attributes
             type(1) -- the specified type of the sentiment
          percentage(1) -- percentage of extreme sentiment
          sentimentSourceEntityList (0,1)
             entity(0..N)
                attributes
                   score
                   href
                   name
          sentimentSubjectEntityList (0,1)
             entity(0..N)
                attributes
                   score
                   href
                   name
    sentimentList (0,1) -- contains list of articles that have sentiment of
a sentimentSource about subject
       sentiment(0..N)
          attributes
             type(1) -- the specified type of the sentiment
          article(1)
             content (1) -- the text that contains the sentiment by the
                sentimentSource about the subject.
             author (1) -- author/publisher of the article
             link (1) -- valid article URL
                attributes:
                   href (1)
                   type (1)
                   hostName (1) -- name of URL host
                   path (1) -- relative path to article
             published (1) -- date of publication
             title (1) -- article title
             titleMatchedLocations(0,1) - includes locations of all
                matched subjects, sources including entities, facets, types,
                keywords, actions, sentiment phrases or a combination there
                of.
                matchedLoc(0..N)
                   attributes
```

-continued

```
                      startPtr
                      endPtr
             contentMatchedLocations (0,1) - includes locations of all
                matched subjects, sources including entities, facets, types,
                keywords, actions, sentiment phrases or a combination there
                of.
                matchedLoc (0..N)
                   attributes
                      startPtr
                      endPtr
```

1.3.1 XML Example: Table 3 below shows an XML example:

TABLE 3

```
...
<MediaResult>
    <sentimentList>
        <sentiment type=positive>
            <content>
"Charlie Rose Show," Geithner claimed that steady overseas demand
for U.S. Treasury debt was a vote of confidence that the Obama
administration was on the right track in countering the "deep
mess" the economy is in. "This president is going to do what is
necessary to get us through this. ... We're a terrifically strong
country with abundant resources, and we will get through this,"
said Geithner, referring to President Barack Obama's commitment
to end the more than year-long U.S. recession. But ahead of this
weekend's Group of 20 gathering of finance chiefs near London,
and a later one in April for political leaders, Geithner said the
United States will push for action by others to match the
aggressive U.S. approach. "You're going to see (President Obama)
lead an ambitious agenda to try to get the world moving with us
so that the global economy is firing on all cylinders," he said,
adding that "getting the world to move with us (is) necessary and
critical."
            </content>
            <sentimentSource>
                <entity href="/person/timothy-geithner...">
                    <name>Timothy Geithner</name>
                </entity>
                <sentimentSourceMatchedLocations>
                    <matchedLocation startPtr="19" endPtr="26"/>
```

TABLE 3-continued

```
            </sentimentSourceMatchedLocations>
        </sentimentSource>
        <subject>
            <entity href="/person/barack-obama...>
                <name>Barack Obama</name>
            </entity>
            <subjectMatchedLocations>
                <matchedLocation startPtr="120" endPtr="124"/>
                <matchedLocation startPtr="300" endPtr="312"/>
                <matchedLocation startPtr="380" endPtr="384"/>
            </subjectMatchedLocations>
        </subject>
        <article>
            <author>Reuters</author>
            <link href="/log/click?url=
http%3A%2F%2Fwww.reuters.com%2Farticle%2FbusinessNews%2FidUSTRE52976R20090311" type="UNKNOWN"
hostName="www.reuters.com"
path="/article/businessNews/idUSTRE52976R20090311"/>
            <published>11 Mar 2009 17:09:15 GMT</published>
            <title>U.S.   in a deep mess   but we will fix it: Geithner</title>
        </article>
    </sentiment>
    ...
</sentimentList>
</mediaResult>
...
```

1.3.2 JSON

JSON is generated using the badgerfish convention:

[/v1/sentiment/by/person/barack-obama-0x16f69.json]

1.4 Response Codes

200—given when input parameters are valid, whether there are valid quotes or not.

400—given when invalid path is entered—e.g. an incorrect path like http://rd-dev:25000/v1/quotations/by/person/barack-obama-0x16f69/about

404—given when the user has entered a sentimentSource or a subject that was not found, e.g. http://rd-dev:25000/v1/quotations/by/person/arun-jacob-0x23421

500—internal system error

E. Sentiment Analysis—Machine Learning Example Embodiment

An embodiment of an NLP SVO (subject-verb-object) style triplet (i.e., a relationship) extraction based sentiment extraction system (SES) includes:

- implicit and explicit feedback collection for algorithmic training and efficacy validation based on an algorithmic seed (i.e., a basic SES pseudo-manually constructed query is used to obtain ballpark sentiment used for additional feedback collection).
- algorithmic model construction based on training data for feature selection, algorithmic parameter determination, and dynamic rule application.
- indexing time application of sentiment algorithm for relationship classification into sentiment categories (sentimentType) like "positive" and "negative" including a category score.
- search time retrieval and ranking of relationships for a given sentimentType and source or subject. Ranking accounts for sentiment category score in post filtering, i.e., re-ranking of results returned from a traditional EVRI Query Language (EQL) query.
- search time sentiment summary determination for a given source or subject where cumulative scores for relationships involving an entity are leveraged.

Training:

1. Ground Truth Construction

An explicit feedback mechanism is constructed into a sentiment user interface (SUI). The example SUI consists of the following use cases:

1.1 Summary Determination

For summary determination, the source or subject of sentiment is specified. If the source is specified, a list of subjects for sentimentType positive, and a list of subjects for sentimentType negative will be returned. For example, if the source is Barack Obama, and the returned sentimentType is negative, a list of subjects of Obama's negative sentiment will be returned such as: GOP, Rush Limbaugh, North Korea, and AIG.

1.2 Sentiment Determination

For sentiment determination, the source, sentimentType, and subject are specified. The source and subject may be an entity or facet. Either the source or subject may not be specified, indicating "anything" is an acceptable value. For example, source=Barack Obama, sentimentType="negative", and subject="anything" will return a list of sentiments made up of a snippet, an article title, link to the article, and a date for the article where Barack Obama is mentioning a negative sentiment about anything. If the subject is AIG, then sentiments with Obama mentioning something negative about AIG will be returned.

The explicit feedback mechanism enables a user to rank the quality of each returned result by selecting one of the following options: "very poor", "poor", "average", "good", "great." Users will be provided these options for both use cases shown above. The results will be stored into a ground truth style training set. For case 1 (the summary sentiment) shown above, the training consists of the corresponding source or subject entities, along with a rating and the entities rank position. For case 2 shown above, the training set consists of the article URI (or other indicator), title, snippet, rank position, and rating.

Algorithm Training:

Training of an indexing time sentiment classifier will begin against the ground truth data set. One strategy is to take a combined rule based and statistical approach. On the statistical side, compute:

topic | positive phrase list | positive verb list | negative phrase list | negative verb list where the topic is determined ad hoc, such as sports, health, everything else. The idea is the word lists are likely different for each topic. Now, the word lists will have an actual score indicating the degree of positivity or negativity for the topic, likely on a 0 to 1 scale. It might help to manually eliminate undesired words.

Indexing Time Application:

For a given document, first determine its topic (simple sum of facet occurrences where each facet is mapped to 1 of the N topic sets; the topic with the greatest number of corresponding facet occurrence wins). Next, use the appropriate word lists to compute a relationship score for every relationship in the document. A given raw relationship score for a given sentimentType can be computed as follows:

$R\_r\_st = w1*Jsent + w2*V$ where,

Jsent=simple Jaccard distance between the stemmed set of phrases (i.e., words and noun phrases) of the sentence and the phrase list for the sentimentType st.

wi=weighting factors

V=score of the corresponding verb in the verb list for the sentimentType st

Next, an average sentiment score D_st for each sentimentType is computed across all relationships in the document. The final relationship score stored is:

R_st=D_st*R_r_st, if and only if R_st>T where T is the minimal score threshold required to mark the relationship as belonging to sentimentType st.

Search Time Application for Sentiment Determination:

At search time, one can search for the source/subject/sentimentType combination as follows:

source>*>subject
    #sentimentType=SENTIMENT_TYPE_VALUE

Now, for each of the returned results, a final ranking score needs to be determined that fuses the score for the relationship search itself, along with R_st.

One method is to start with a simple weighted combination of the form: w1*Rr+w2*R_st.

Search Time Application for Sentiment Summary Determination:

At search time, search for the source/subject/sentimentType combination as follows:

source>*>subject
    #sentimentType=SENTIMENT_TYPE_VALUE

Now, for each relationship, extract entities/facets, and compute the entity score as:

Es=w1*fc*(sum(r))+w2*Ravg_st where, wi=weighting factors;

fc=frequency of occurrence across the full result set;

sum(r)=sum of rank_order for the occurrences of the entity/facet;

Ravg_st=average relationship score containing the entity/facet for the given sentimentType st.

Finally, the efficacy is computed against the ground truth, some weights are tweaked, and the process repeated. In some embodiments, the weight determination is automated.

Conclusion:

The above algorithms are examples to show how machine learning techniques may be applied to improve sentiment analysis that uses NLP based (SVO) relationship information. Nuances of the above specifics may yield more precise results and may be similarly integrated.

F. Attack Machine Example

Description

The AttackMachine is an example site targeting an in depth assessment of all things "attack" oriented. AttackMachine is intended to highlight differentiating technology available by EVRI from the EVRI API. AttackMachine is intended to showcase what can be built on top of the EVRI "triplet" or subject/verb/object style data extraction (using EVRI relationship searching). The AttackMachine site template can easily be extended to other verbs, or actions, such as: LoveMachine, HateMachine, KillMachine, etc. In each case, the equivalent of "attackers" and "victims" are present. For example, for LoveMachine, the source/targets of the verb love are "The lover" and "The loved".

Visual Specification

Figure 6A:
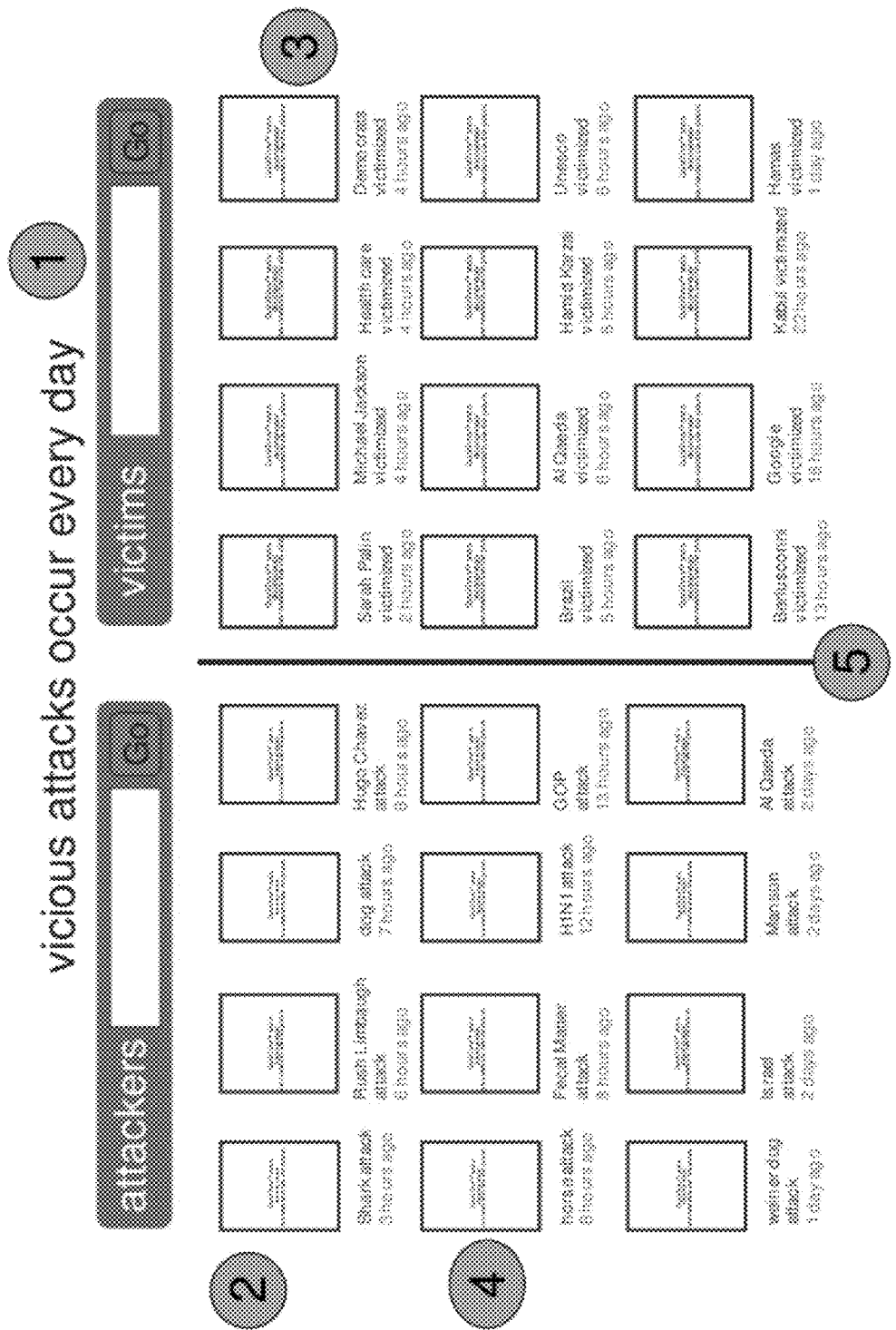
FIGS. 6A-6N illustrate example screen displays of an example user interface provided by an example embodiment of a Sentiment Analysis System.
Figure 6B:
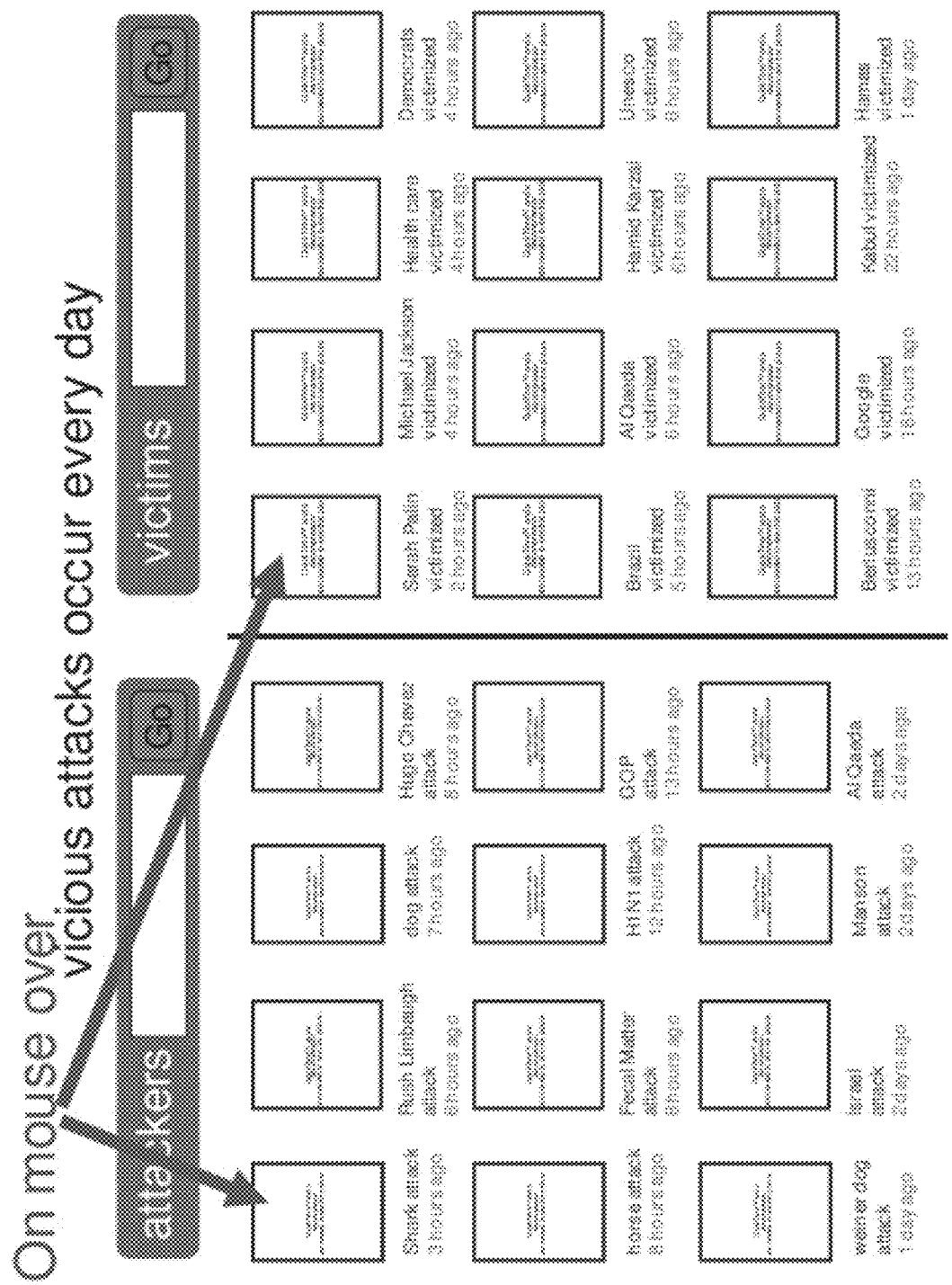
Figure 6C:
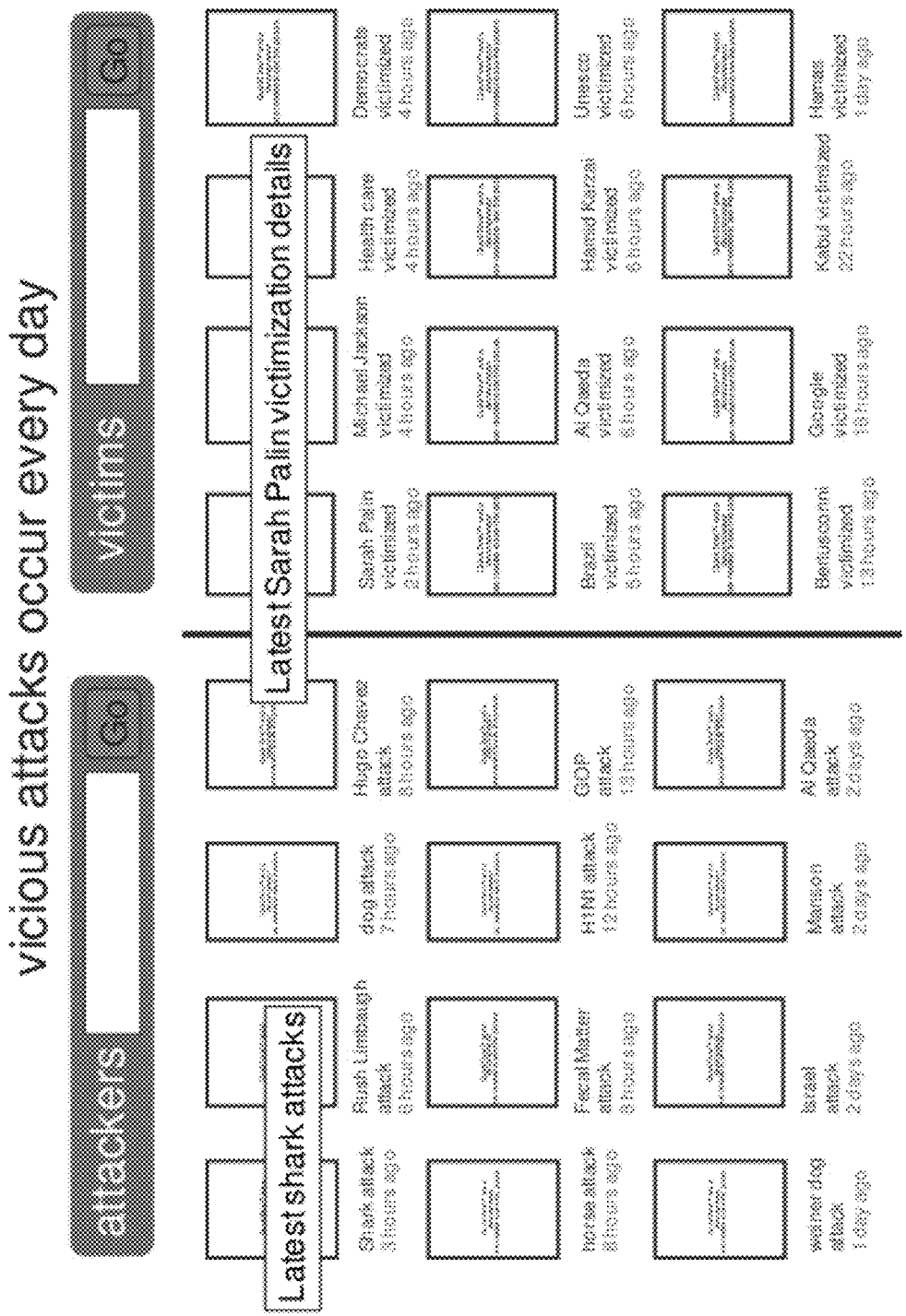
Figure 6D:
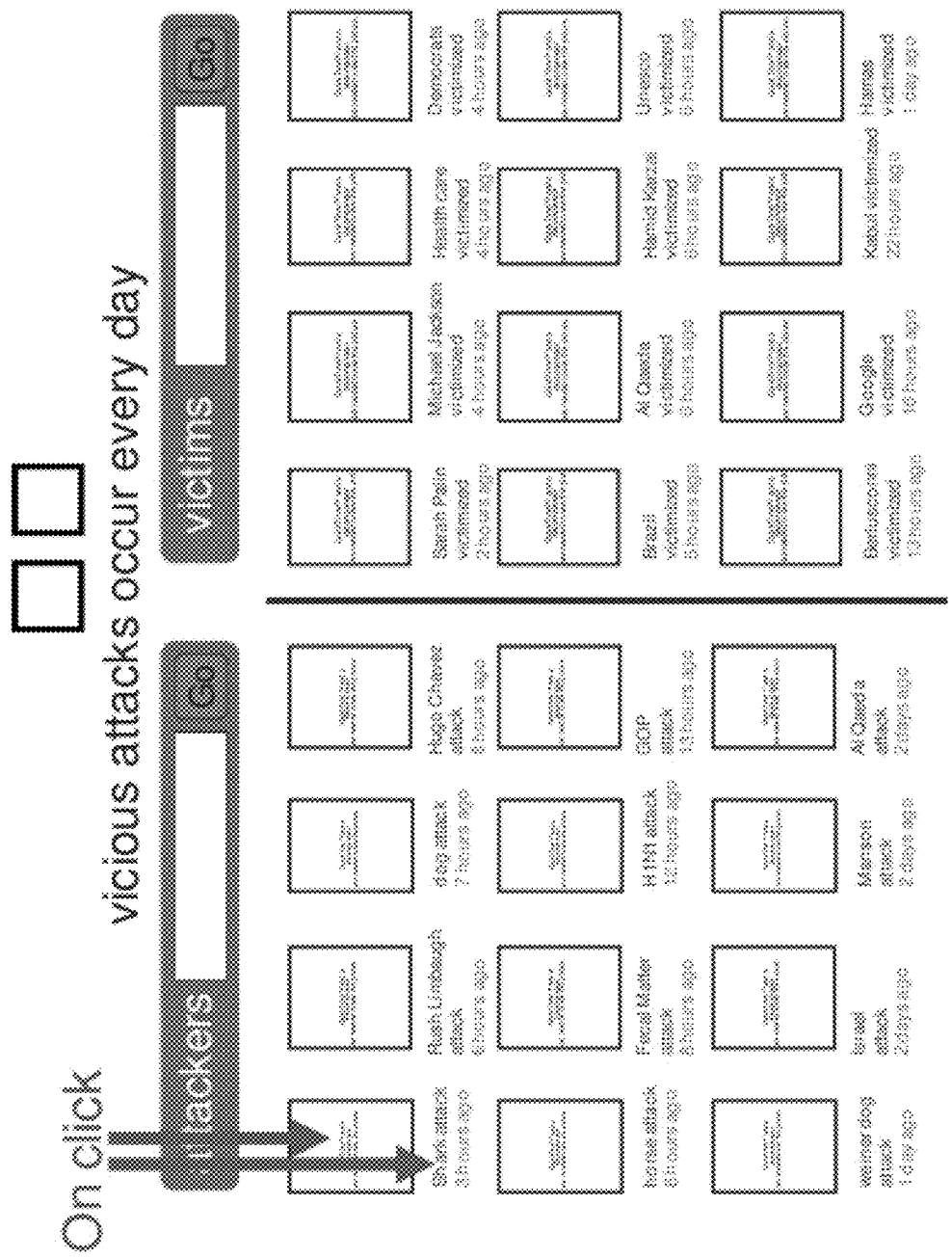

FIGS. 6A-6N illustrate example screen displays of an example user interface provided by an example embodiment of a Sentiment Analysis System. In particular, the illustrated screen displays are from an example of one embodiment of the AttackMachine website.

The following functional specification and other instructions shows how to build such a site using the Sentiment Analysis API and other EVRI API. A detailed explanation of the current EVRI API can be found on the EVRI website, currently located at www.evri.com/develor/REST. It is to be understood that a variety of variations of the presentation of visuals and a variety of content can be similarly shown on a website or in other forms of content presentable through displaying or otherwise (e.g., audio, streaming, etc.) to a user or other consumer of such information.

Example Embodiment of Visual Specification

The following bullet points correspond to reference numbers indicated by numbered green dots shown in FIGS. 6A-6N:

Reference 1 in FIG. 6A indicates a Terse description of the site. Should be modifiable on a new code drop.

Reference 2 in FIG. 6A indicates getting a most popular attacker list (i.e., home page results). Note: any way of doing this can be incorporated. However, the following algorithm using EVRI functions may be used do a decent job of getting the results.

Determining the top entities:

Every "n" minutes (e.g., 15), execute the following queries:

1. Get a list of attacking animals, e.g.,

```
http://api.evri.com/rd/servlet/RequestDispatcherServlet?req=eq&q=
[organism]+{aggregate}%3Eattack&qd=Attacker
```

For any returning cell containing an entityId, convert the ID to hex and preceed with /organism/NAME-HEXID, where NAME is the cell's Desc value with case dropped and whitespace substituted with "-". Example:

```
<Row>
<Query>coyote>attack</Query>
<Count>4</Count>
-
<Cell>
<Desc>coyote</Desc>
<EntityId>3743769</EntityId>
</Cell>
</Row>
becomes
/organism/coyote-0x392019
```

2. Get a list of attacking persons, e.g.,

```
http://api.evri.com/rd/servlet/RequestDispatcherServlet?req=eq&q=
[person/name]+{aggregate}%3Eattack&qd=Attacker
```

For any returning cell containing an entityId, convert the id to hex and preceed with /person/NAME-HEXID (see above example)

3. Repeat step 2 for: [location/name], [organization/name], [condition], [concept] or any other entities that could be "attackers."

4. Organize the information

A. Form 4 (or "n" depending upon what was searched) sets, set 1: persons, set 2: locations, set 3: organizations, set 4: things (organism, condition, concept) . . . .

B. For each entity, in each set, get the list of articles for the attacker, by executing a query something like: http://api.evri.com/v1/person/sarah-palin-0x2a889/relations/verb/attack?media=article C. Sort the articles by date, and take the most recent for the date displayed in the visual specification corresponding to the entity.

D. Sort the entities by date within each set.

5. Form a new entity set of 20 entities with slots as follows: slot 1=top person, slot 2=top thing, ... slot 4=top location, slot 5=2nd person, slot 8=2nd location, and so on to max of slot 20.
6. Sort this set by date to populate the attackers list on the home page. (Slide 3)

Reference 3 in FIG. 6A indicates getting a most popular victim list.

1. Example call to get most popular victim list:

```
http://api.evri.com/rd/servlet/RequestDispatcherServlet?req=eq&q=
*>attack>[person/name]+{aggregate}&qd=Victim
```

For remaining steps, process find top entities similarly to steps 1-6 above for most popular attacker list, making changes in the queries as appropriate.

2. For step 4.b. above, use: http://api.evri.com/v1/person/hamid-karzai-0x26e7f/relations/qt/attacked-by-0xe?media=article Reference 4 in FIG. 6A indicates Image instructions: Note that the images are not shown in the slides they are currently replaced by a placeholder "QuickTime™ and a decompressor are needed to see this picture." In the real home page, the following algorithms can be used to supply the pictures.
  A. Images used should be the same as those on EVRI Entity Data Page (EDP) pages. If no image is present for the corresponding URI, then an image shall be pulled based on the entity type. Generic images corresponding to attacker and victim for each of the 6 types used in this example: organism, person, place, organization, condition, concept should be provided in SVN.
  B. In one example embodiment as shown, a maximum of 40 images, 20 for attackers, and 20 for victims is rendered on the homepage. The images may be ordered by date from left to right proceeding down the matrix as shown in the visual specification.
  C. Below each image, the entity name and trailing wording is displayed as shown in the visual specification. In addition, the time stamp is shown as rendered. The date formatting (i.e., 1 hour ago, 14 hours ago, 3 days ago, etc.) may be the same as that used elsewhere on Evri.com.

Reference 5 in FIG. 6A indicates a FAQ: Centered below the images is a generic about FAQ style statement (not shown in the visual spec).

Figure 6E:
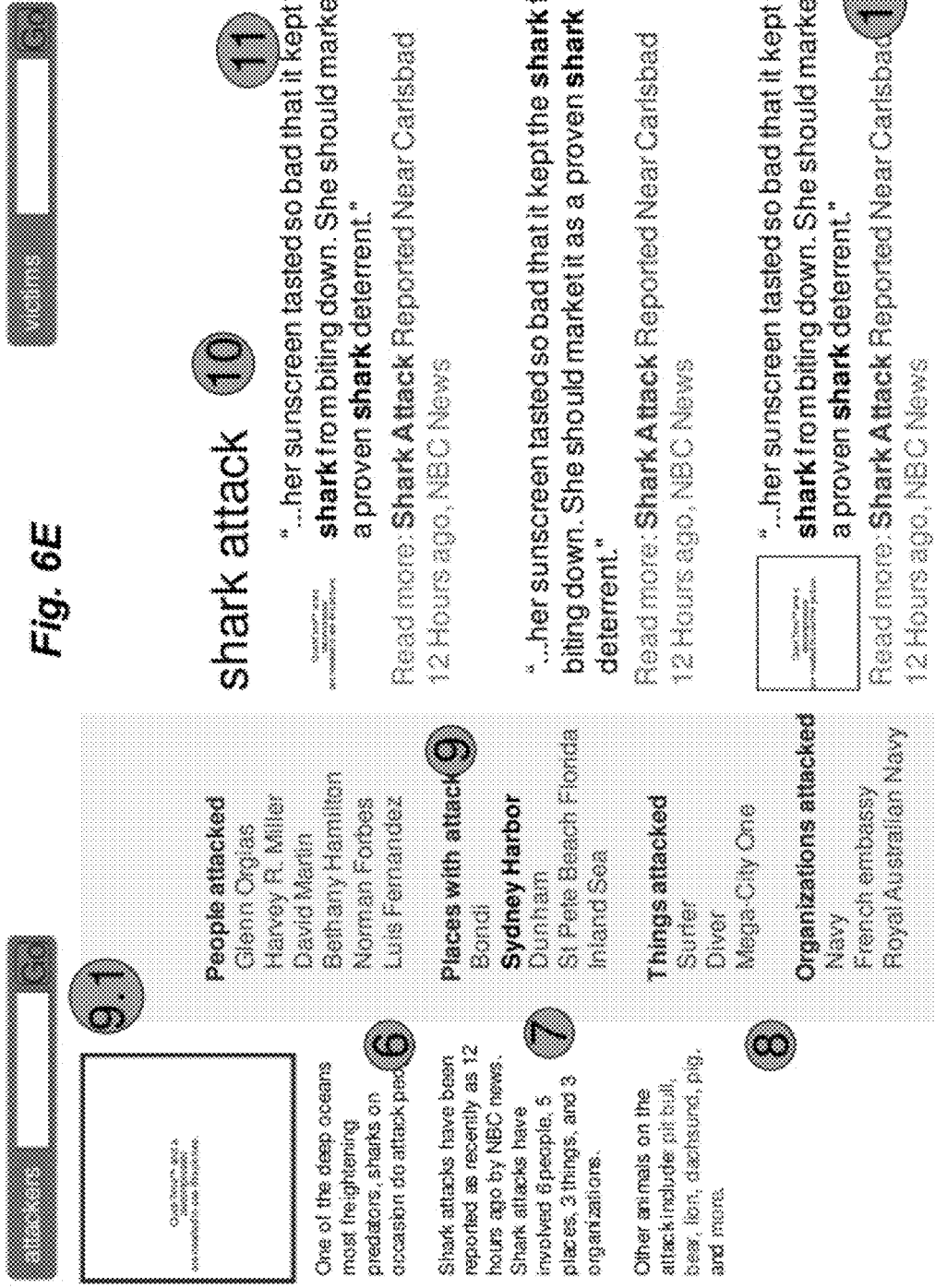

Reference 6 in FIG. 6E indicates unique content manually generated and programmatically accessible.
  A. If content, such as an entity level description, is accessible at the entity level, use it; for example, no less than once every 15 minutes.
  B. If no content is accessible at the entity level, use facet level description information, if it is available; for example, no less than once every 15 minutes.
  C. If no entity or facet level information is available, use type level description information, if it is available; for example, no less than once every 15 minutes.
  D. If the page is being generated for an unknown entity (no id is present because someone just used the search box), then no description is typically shown (or some type of default text or other description).

Reference 7 in FIG. 6E indicates Unique content automatically generated based on default template text, for example, from an API response. Example algorithm is as follows:
  A. #entity attacks have been reported as recently as #timestamp by #publisher. #entity attacks have involved #N_p people, #N_pl places, #N_o organizations, and #N_t things.
  B. In step above, #entity is the name of the entity or query term. The first letter should be capitalized. The most recent article properties should be used to populate the #publisher and #timestamp fields.
  C. #N_t corresponds to the sum of entities with type condition, concept, or organism.
  D. Care should be taken to ensure the sentences read in correct English syntax, for example with an "and" before the final item listed.

Reference 8 in FIG. 6E indicates a natural language statement of other entities of the same type, in this case organism (displayed as animal) attacking. In EVRI, the list of entities should be determined by calling: http://is.gd/37OuR.

Reference 9 in FIG. 6E indicates a List of people, places, or things attacked.
  A. Make REST API call, i.e.,

```
http://api.evri.com/v1/organization/republican-party-
0x3e569/relations/verb/attack?appId=attackmachine
```

Now, for each of the targets returned, check the type portion of the URI. Then break out the display according to the grouping described in Green Dot step 7.A. above, i.e., people, places, organization and things with things being either type condition, concept or organism.
  B. Show a maximum of 10 items attacked.
  C. If no results are returned, drop the hex number, and re-issue the request. For example, if:

```
http://api.evri.com/v1/organism/pit-
bull-0x39716d/relations/verb/attack?appId=attackmachine
``` yields no results, execute:

```
http://api.evri.com/v1/organism/pit-bull/relations/verb/attack?appId=
attackmachine
```

Reference 9.1 in FIG. 6E indicates, for this particular example visual embodiment, if the type of the entity is organism, then render videos.
  A. The video carousel and resulting behavior can be exactly the same as that in the profile section of the Evri collections functionality.
  B. To obtain the videos, make the REST request:

```
http://api.evri.com/v1/organism/shark%20attack/media/related?type=
vide&appId=attackmachine
``` where shark is obtained by dropping the hex portion of the entity URI if it is present, and the word attack is appended.

Reference 10 in FIG. 6E indicates terse wording of what the page is about.

Reference 11 in FIG. 6E indicates an Article summary display. In the example visual specification:
  A. Bolding should be applied. Note: the API does not return the matched locations for the verb attack. Do a string search for all instances of words starting with the word: attack and bold the entire word.
  B. Maximum of 10 article results should be displayed. "More" should be displayed at the bottom of the results. If it is clicked, search for 20 results and render all.
  C. Note: Top entities are intentionally omitted.

D. Attached article images should be shown as displayed whenever present.
E. To get articles for general entity>attack case:

```
http://api.evri.com/v1/organism/grizzly-bear/relations/verb/attack?media=
article&includeMatchedLocations=true&appId=attackmachine
```

Reference 12 in FIG. 6E indicates top 5 attackers and victims as shown on the home page stated in natural language form.

Figure 6G:
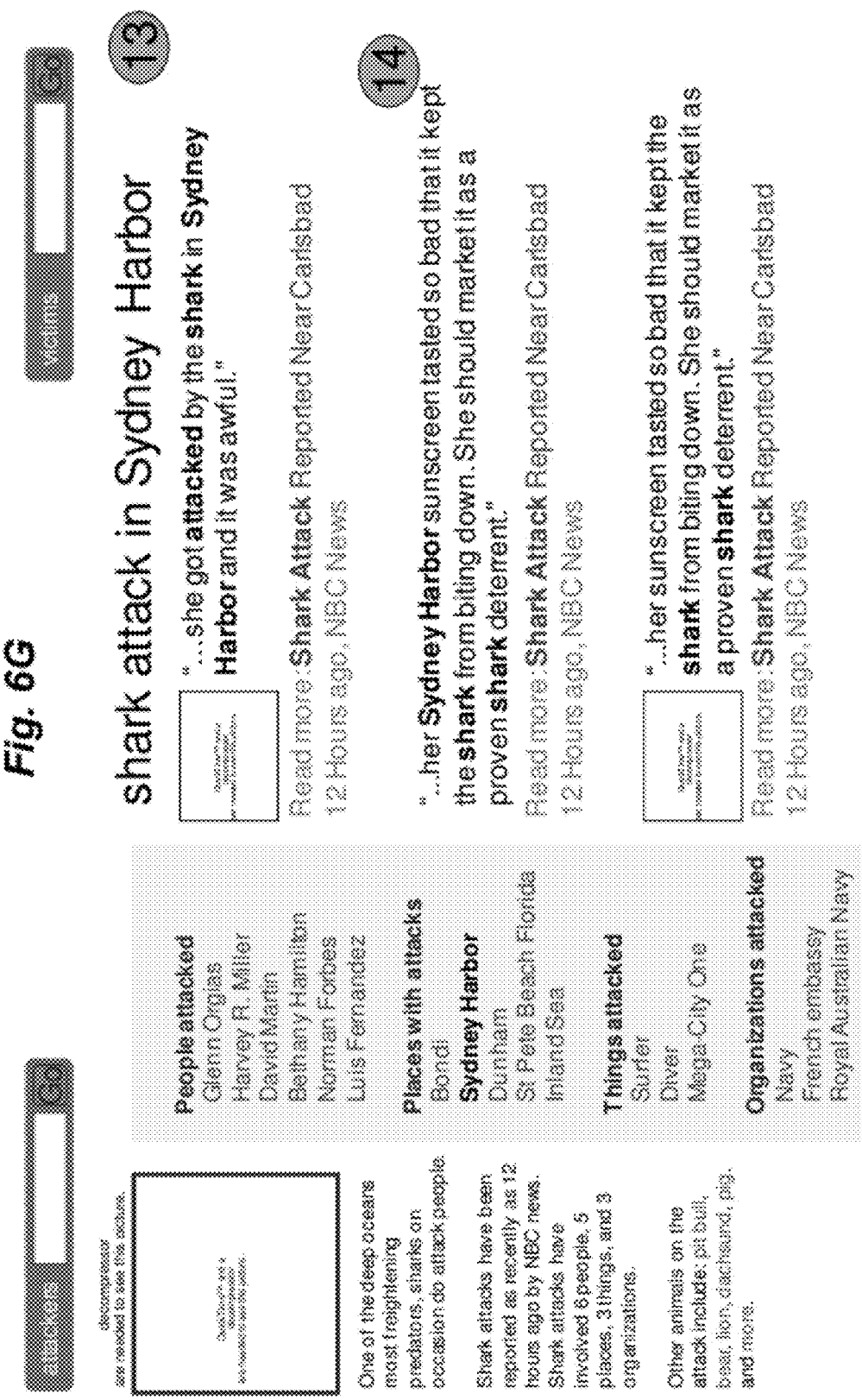
Figure 6H:
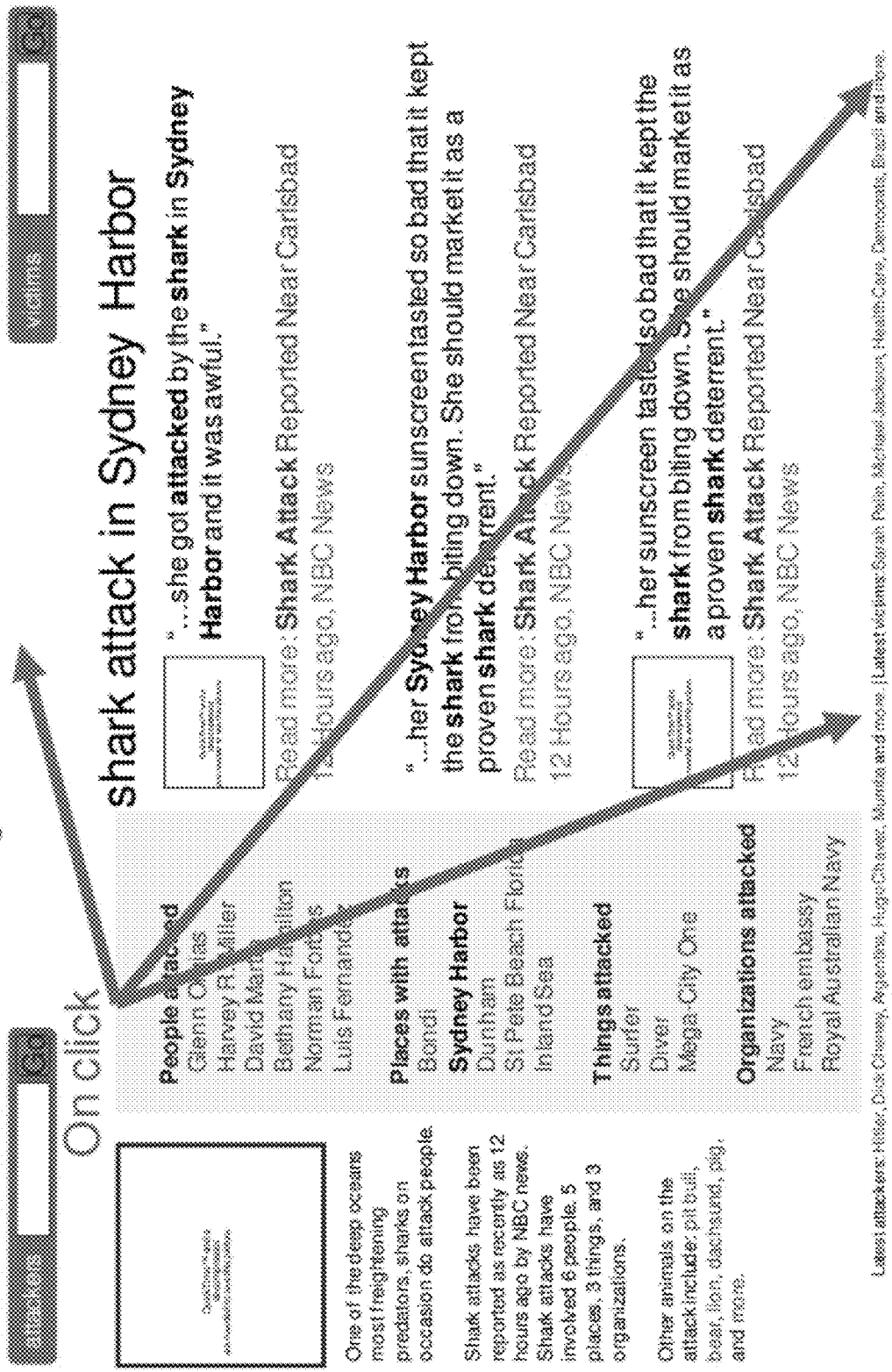
Figure 6I:
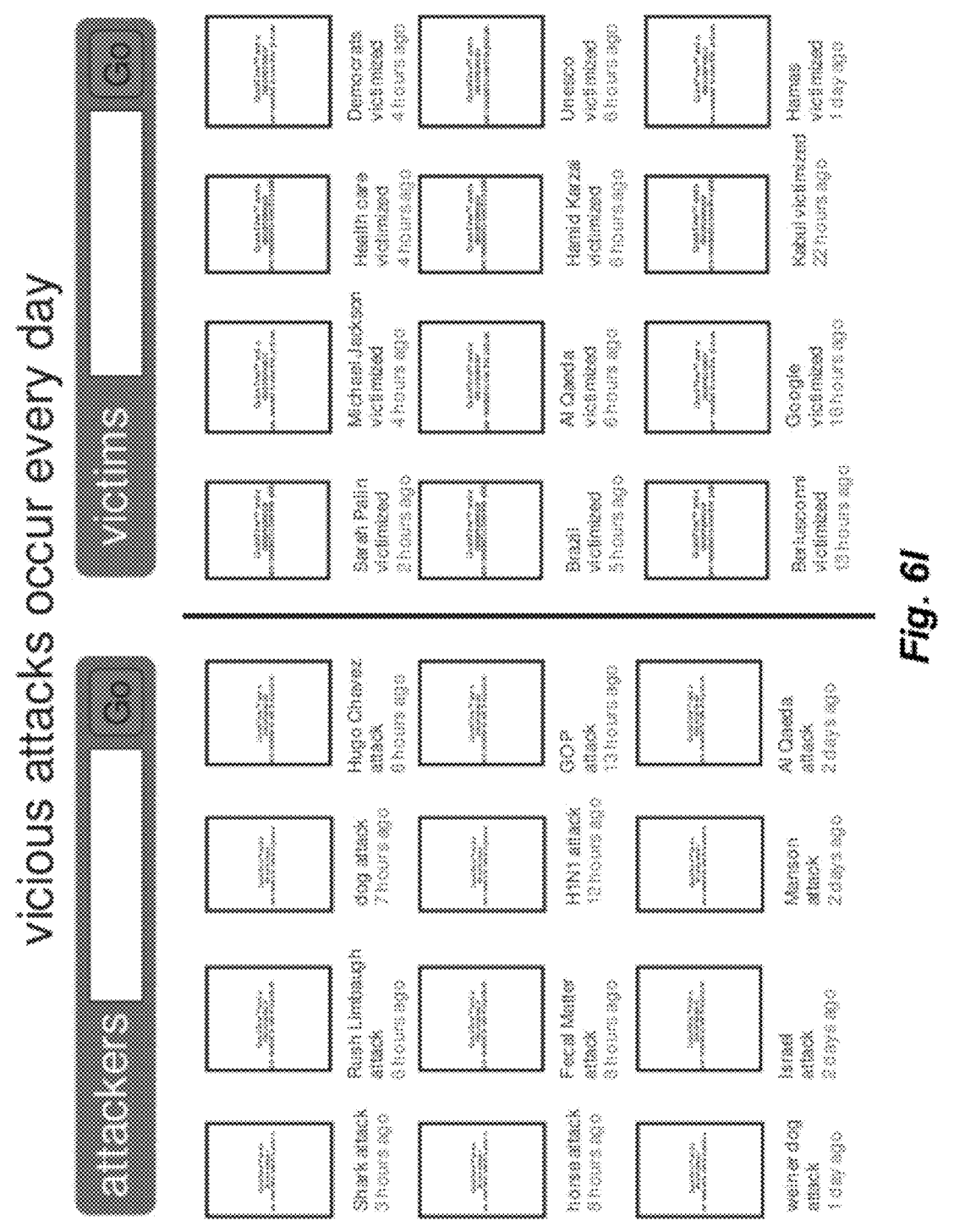

Reference 13 in FIG. 6G indicates a terse result summary statement change. Note wording. Also note: the clicked on term is now bolded.

Reference 14 in FIG. 6G indicates revised articles for specific entity>attack>entity case:

```
http://api.evri.com/v1/organism/grizzly-
bear/relations/verb/attack/location/alaska-0x38fd9?media=
article&includeMatchedLocations=true&appId=attackmachine
```

Figure 6J:
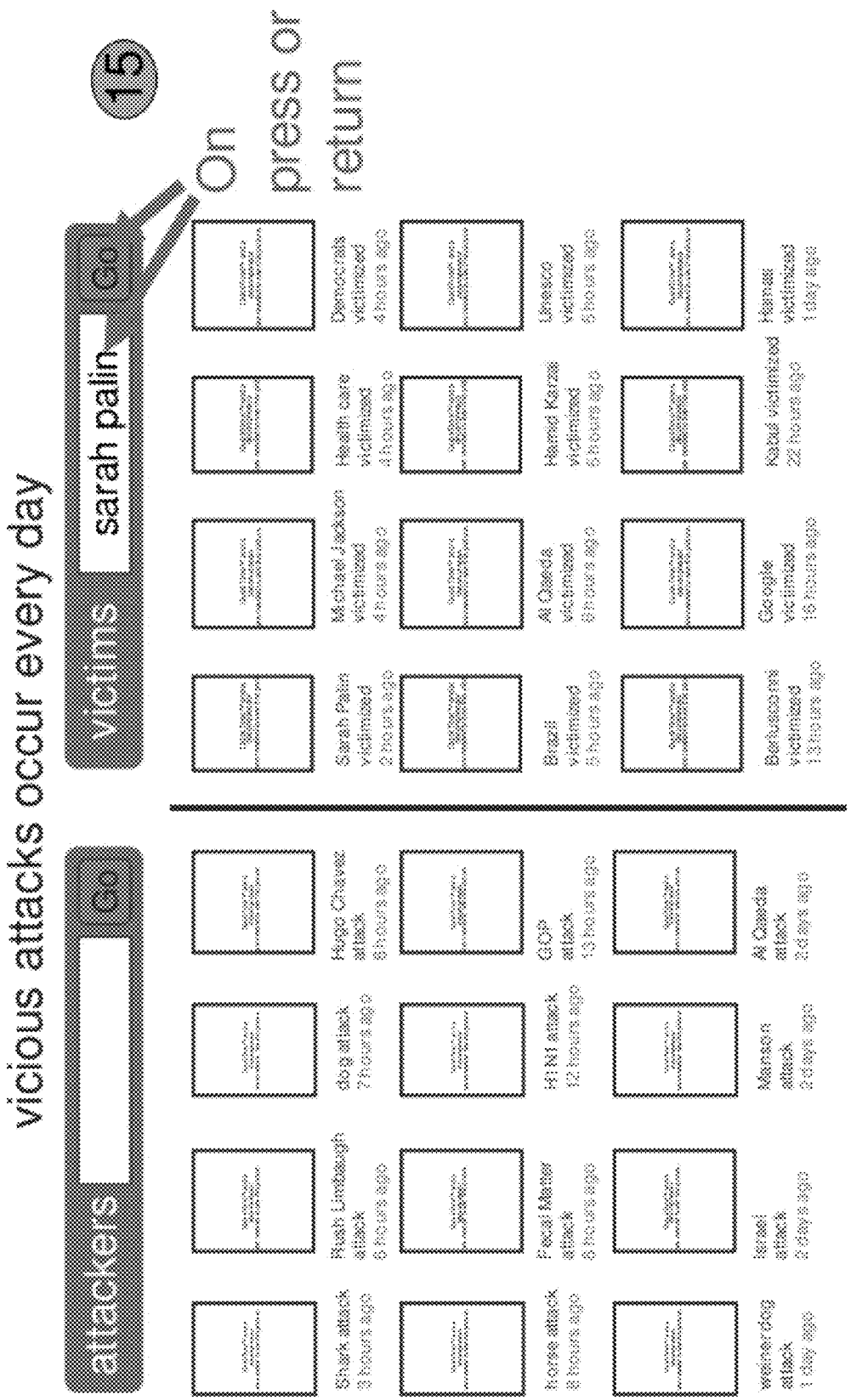

Reference 15 in FIG. 6J indicates user searches for something specific
  A. If the user term has only one exact match (meaning the entity names match exactly, not that only 1 entity is returned from the call) while using this API call:

```
http://api.evri.com/v1/entities/find?prefix=sarah%20palin&appId=
attackmachine
``` then send the user to that entities attack page.
  B. If more than one exact match exists, render a query based attack page as shown in the slide with Green Dot 22. For example, if the user types in "shark", render the page by using the API call:

```
http://api.evri.com/v1/concept/shark/relations/verb/attack?media=
article&appId=attackmachine%E2%80%89
```

Figure 6L:
Figure 6N:
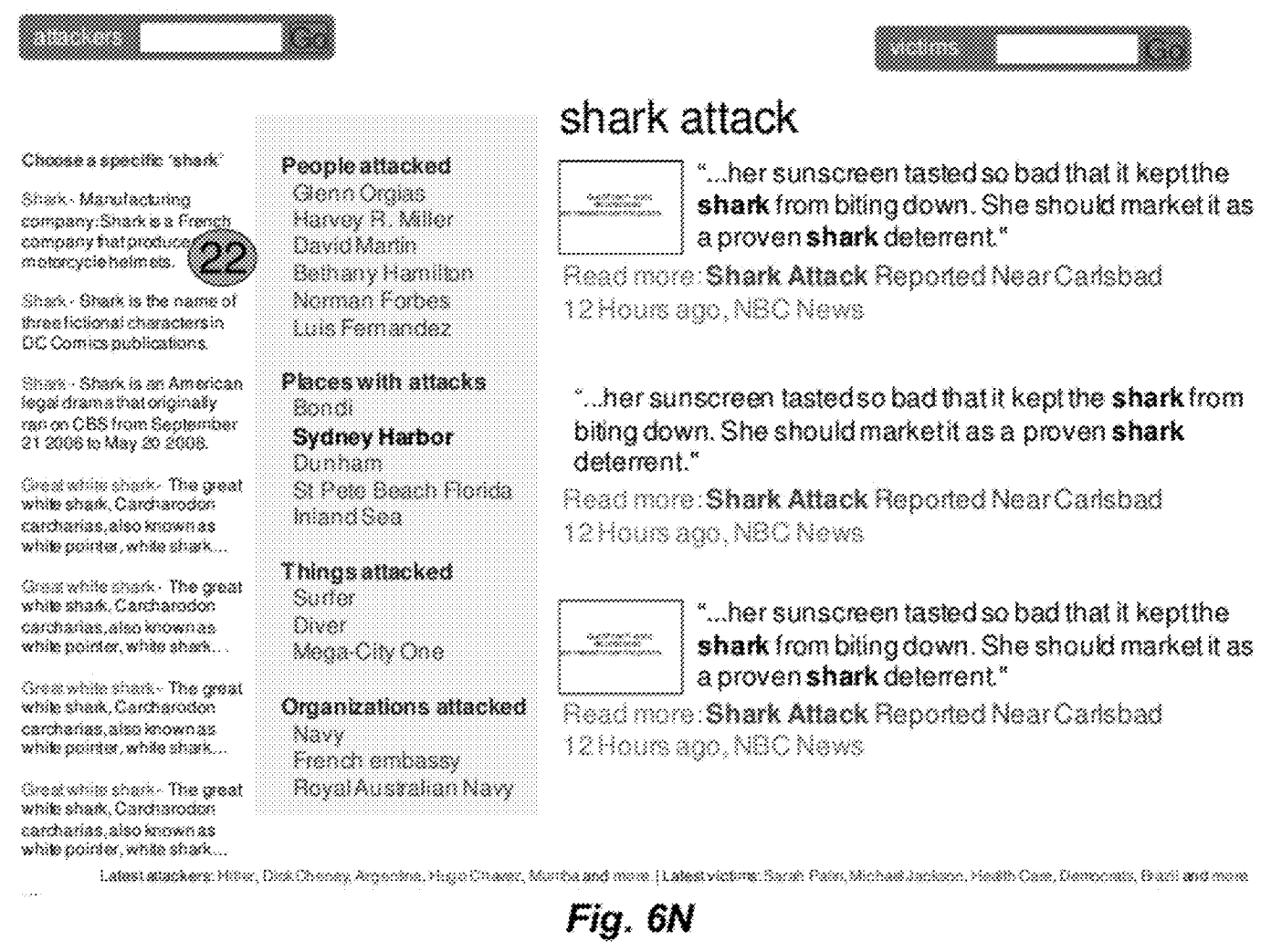

Note: /concept/shark with no hex-id is used to represent the keyword shark.
  C. If no results are returned from the REST call described in 15. A., then instead of the prefix call, use this API call:
    http://api.evri.com/v1/entities?name=health care
    References 16-21 in FIGS. 6L and 6M indicate Victim Rendering.
    Same as the attack case, with differences addressed.
    Reference 22 in FIG. 6N indicates a search result display scenario. Other Miscellaneous Preferences:
      Home page title: "The Attack Machine"
      Entity attack page titles: "#entity Attacks—The Attack Machine", i.e. "Shark Attacks—The Attack Machine"
      Entity victim page titles: "#entity—Attack Victim—The Attack Machine", i.e., "Sarah Palin—Attack Victim—The Attack Machine"
      URLs for entity attack pages should be of the form:

```
http://www.attackmachine.net/attacker/organism/pit-bull-x39716d
```

URLs for query phrase attack pages should be of the form:
  http://www.attackmachine.net/attacker/phrase/pit bull
  URLs for entity victim pages should be of the form:

```
http://www.attackmachine.net/victim/person/sarah-palin-0x2a889
```

URLs for query phrase victim pages should be of the form:
  http://www.attackmachine.net/victim/phrase/hate
  All of the above U.S. patents, U.S. patent application publications, U.S. patent applications, foreign patents, foreign patent applications and non-patent publications referred to in this specification including but not limited to U.S. Pat. No. 7,526,425, issued on Apr. 28, 2009, and entitled "METHOD AND SYSTEM FOR EXTENDING KEYWORD SEARCHING FOR SYNTACTICALLY AND SEMANTICALLY ANNOTATED DATA;" U.S. patent application Ser. No. 12/288,158, filed Oct. 15, 2008, and entitled "NLP-BASED ENTITY RECOGNITION AND DISAMBIGUATION;" and U.S. Provisional Patent Application No. 61/372,684, filed Aug. 11, 2010, and entitled "NLP-BASED SENTIMENT ANALYSIS" are incorporated herein by reference in their entireties From the foregoing it will be appreciated that, although specific embodiments have been described herein for purposes of illustration, various modifications may be made without deviating from the spirit and scope of the invention. For example, the methods, systems, and techniques for performing sentiment analysis discussed herein are applicable to other architectures other than an NLP architecture. Also, the methods, systems, and techniques discussed herein are applicable to differing protocols, communication media (optical, wireless, cable, etc.) and devices (such as wireless handsets, electronic organizers, personal digital assistants, tablet computers, smart phones, portable email machines, game machines, pagers, navigation devices such as GPS receivers, etc.).

The invention claimed is:
1. A computer-implemented method for analyzing a collection of content for sentiment data, comprising:
  executing a first relationship query against the content in the collection to determine and extract from the content a plurality of relationships between entities, each extracted relationship specifying a subject, an action, and an object and exhibiting positive sentiment for an entity that is a source of positive sentiment towards an entity that is a subject of the positive sentiment, wherein a relationship with positive sentiment is extracted from the content as a result of executing the first relationship query when the action of the relationship with positive sentiment matches at least one of a plurality of identified positive verbs and when negative phrases that match a negative phrase list are not found within a first determined number of sentences;
  executing a second relationship query against the content in the collection to determine and extract from the content a plurality of relationships between entities, each extracted relationship specifying a subject, an action, and an object and exhibiting negative sentiment for an entity that is a source of negative sentiment towards an entity that is a subject of the negative sentiment, wherein a relationship with negative sentiment is extracted from the content as a result of executing the second relationship query when the action of the relationship with negative sentiment matches at least one of a plurality of identified negative verbs and when positive phrases that match a positive phrase list are not found within a second determined number of sentences;
  wherein the first and second relationship queries are specified using a natural language query mechanism that uses syntactic and semantic analysis of the content to recognize and understand relationships expressed between entities in the content and wherein each query specifies a subject, an action, and an object related to the subject through the action;

determining a percentage of the determined and extracted relationships exhibiting positive sentiment to a total of determined and extracted relationships exhibiting either positive or negative sentiment;

determining a percentage of the determined and extracted relationships exhibiting negative sentiment to a total of determined and extracted relationships exhibiting either positive or negative sentiment; and presenting on a display device, a user interface that indicates the percentage of the determined and extracted relationships exhibiting positive sentiment and the relationships exhibiting negative sentiment for the entity that is the source of sentiment towards the entity that is the subject of the sentiment, in conjunction with presenting, for each extracted relationship, indications of the entity that is the source of sentiment and the entity that is the subject of the sentiment.

2. The method of claim 1, wherein the source of positive sentiment or the source of negative sentiment is a facet or a topic.

3. The method of claim 1, wherein the subject of the positive sentiment or negative sentiment is a facet or a topic.

4. The method of claim 1, wherein the collection of content is a corpus of documents.

5. The method of claim 1, wherein the collection of content is a set of web pages.

6. The method of claim 1, further comprising:
filtering the determined and extracted relationships exhibiting positive sentiment for those contradicting a phrase of a corresponding other portion of the content in which the relationship was found.

7. The method of claim 6, wherein the corresponding portion of the content is a title.

8. The method of claim 1, further comprising:
filtering the determined and extracted relationships exhibiting negative sentiment for those contradicting a phrase of a corresponding title of the content in which the relationship of positive sentiment or the relationship of negative sentiment was found.

9. The method of claim 1, wherein the entity that is a source of positive sentiment or negative sentiment is an identified facet, topic, or string.

10. The method of claim 1, wherein the entity that is a subject of the positive sentiment or the negative sentiment is any facet, topic, or string.

11. The method of claim 1, further comprising:
aggregating and ranking the determined and extracted relationships exhibiting negative sentiment.

12. The method of claim 1, further comprising:
aggregating and ranking the determined and extracted relationships exhibiting positive sentiment.

13. A computer-readable memory medium containing content that, when executed, presents sentiment data of a collection of indexed content by performing a method comprising:
executing a first relationship query against the content in the collection to determine and extract a plurality of relationships between entities, each extracted relationship specifying a subject, an action, and an object and exhibiting positive sentiment for an entity that is a source of positive sentiment towards an entity that is a subject of the positive sentiment, wherein a relationship with positive sentiment is extracted from the content as a result of executing the first relationship query when the action of the relationship with positive sentiment matches at least one of a plurality of identified positive verbs and when negative phrases that match a negative phrase list are not found within a first determined number of sentences;

executing a second relationship query against the content in the collection to determine and extract from the content a plurality of relationships between entities, each extracted relationship specifying a subject, an action, and an object and exhibiting negative sentiment for an entity that is a source of negative sentiment towards an entity that is a subject of the negative sentiment, wherein a relationship with negative sentiment is extracted from the content as a result of executing the second relationship query when the action of the relationship with negative sentiment matches at least one of a plurality of identified negative verbs and when positive phrases that match a positive phrase list are not found within a second determined number of sentences wherein the first and second relationship queries are specified using a natural language query mechanism that uses syntactic and semantic analysis of the content to recognize and understand relationships expressed between entities in the content and wherein each query specifies a subject, an action, and an object related to the subject through the action;

determining a percentage of the determined and extracted relationships exhibiting positive sentiment to a total of determined and extracted relationships exhibiting either positive or negative sentiment;

determining a percentage of the determined and extracted relationships exhibiting negative sentiment to a total of determined and extracted relationships exhibiting either positive or negative sentiment; and presenting on a display device, a user interface that indicates the percentage of the determined and extracted relationships exhibiting positive sentiment and the relationships exhibiting negative sentiment for the entity that is the source of sentiment towards the entity that is the subject of the sentiment, in conjunction with presenting, for each extracted relationship, indications of the entity that is the source of sentiment and the entity that is the subject of the sentiment for each extracted relationship.

14. A computing system comprising:
a memory;
a computer processor; and
a sentiment analysis engine component stored in the memory and configured, when executed on the computer processor, to:
execute a first relationship query against the content in the collection to determine and extract from the content a plurality of relationships between entities, each extracted relationship specifying a subject, an action, and an object and exhibiting positive sentiment for an entity that is a source of positive sentiment towards an entity that is a subject of the positive sentiment, wherein a relationship with positive sentiment is extracted from the content as a result of executing the first relationship query when the action of the relationship with positive sentiment matches at least one of a plurality of identified positive verbs and when negative phrases that match a negative phrase list are not found within a first determined number of sentences;

execute a second relationship query against the content in the collection to determine and extract from the content a plurality of relationships between entities, each extracted relationship specifying a subject, an action, and an object and exhibiting negative sentiment for an entity that is a source of negative sentiment towards an entity that is a subject of the negative sentiment, wherein a relationship with negative sentiment is extracted from the content as a result of executing the second relationship query when the action of the relationship of negative sentiment matches at least one of a plurality of identified negative verbs and when positive phrases that match a positive phrase list are not found within a second determined number of sentences;

wherein the first and second relationship queries are specified using a natural language query mechanism that uses syntactic and semantic analysis of the content to recognize and understand relationships expressed between entities in the content and wherein each query specifies a subject, an action, and an object related to the subject through the action;

determine a percentage of the determined and extracted relationships exhibiting positive sentiment to a total of determined and extracted relationships exhibiting either positive or negative sentiment;

determine a percentage of the determined and extracted relationships exhibiting negative sentiment to a total of determined and extracted relationships exhibiting either positive or negative sentiment; and present an indication of the percentage of the determined and extracted relationships exhibiting positive sentiment and an indication of the determined and extracted relationships exhibiting negative sentiment for the entity that is the source of sentiment towards the entity that is the subject of the sentiment, in conjunction with presenting, for each extracted relationship, indications of the entity that is the source of sentiment and the entity that is the subject of the sentiment.

15. A non-transitory computer-readable medium containing instructions for controlling a computer processor to provide a user interface widget on a display device, the user interface widget further configured, when executed, to:

determine and extract a plurality of relationships between entities exhibiting positive sentiment in a collection of content, the relationships determined using natural language relationship searching techniques that use syntactic and semantic analysis of the content to recognize and understand relationships expressed between entities in the content, wherein a relationship with positive sentiment having a subject, an action, and an object is extracted from the content when the action of the relationship with positive sentiment matches at least one of a plurality of identified positive verbs and when negative phrases that match a negative phrase list are not found within a first determined distance;

determine and extract a plurality of relationships between entities exhibiting negative sentiment in a collection of content, the relationships determined using natural language relationship searching techniques that use syntactic and semantic analysis of the content to recognize and understand relationships expressed between entities in the content, wherein a relationship with negative sentiment having a subject, an action, and an object is extracted from the content when the action of the relationship of negative sentiment matches at least one of a plurality of identified positive verbs and when negative phrases that match a negative phrase list are not found within a second determined distance;

present summary data that indicates a percentage of the determined and extracted relationships exhibiting positive sentiment and an indication of a percentage of the determined and extracted relationships exhibiting negative sentiment for the entity that is the source of sentiment towards the entity that is the subject the subject of the sentiment; and upon selection of the entity that is a source of sentiment and a presented type of sentiment, determining and presenting a subset of the determined and extracted relationships exhibiting the selected type of sentiment having the selected source of sentiment.

16. The non-transitory computer-readable medium of claim 15, wherein the user interface widget is code embeddable in other content.

* * * * *